March 23, 1954

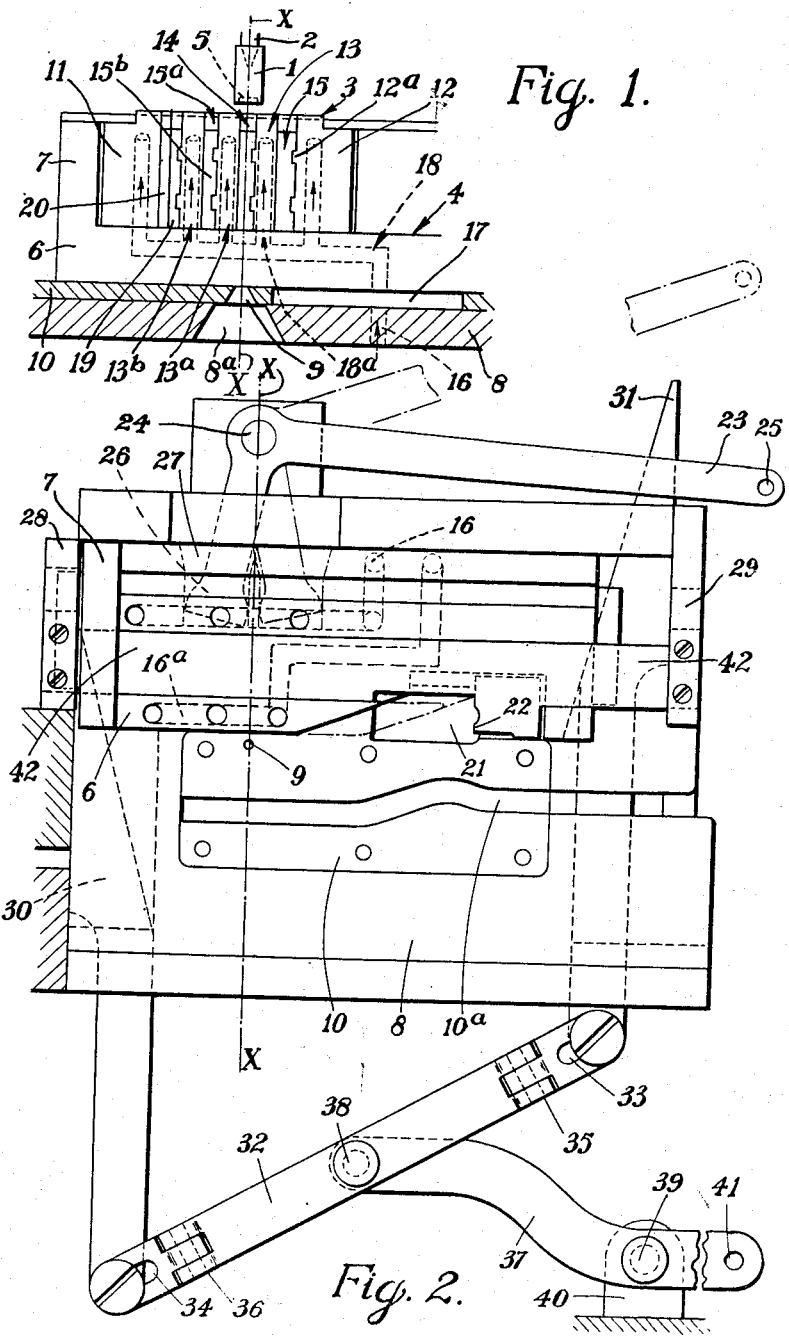

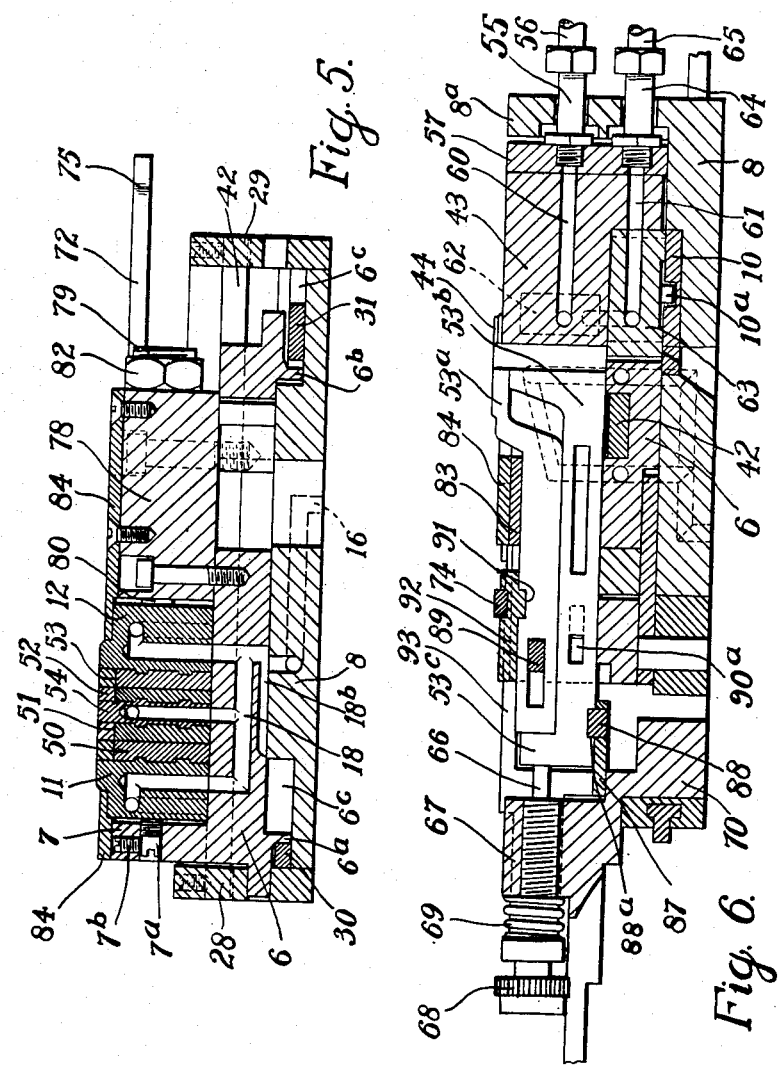

H. G. CROUCHER 2,672,975

MOLD ARRANGEMENT, ESPECIALLY FOR TYPOGRAPHICAL
COMPOSING APPARATUS OR MACHINES

Filed July 27, 1951

INVENTOR
Henry G. Croucher,
BY
Hall & Houghton
ATTORNEY

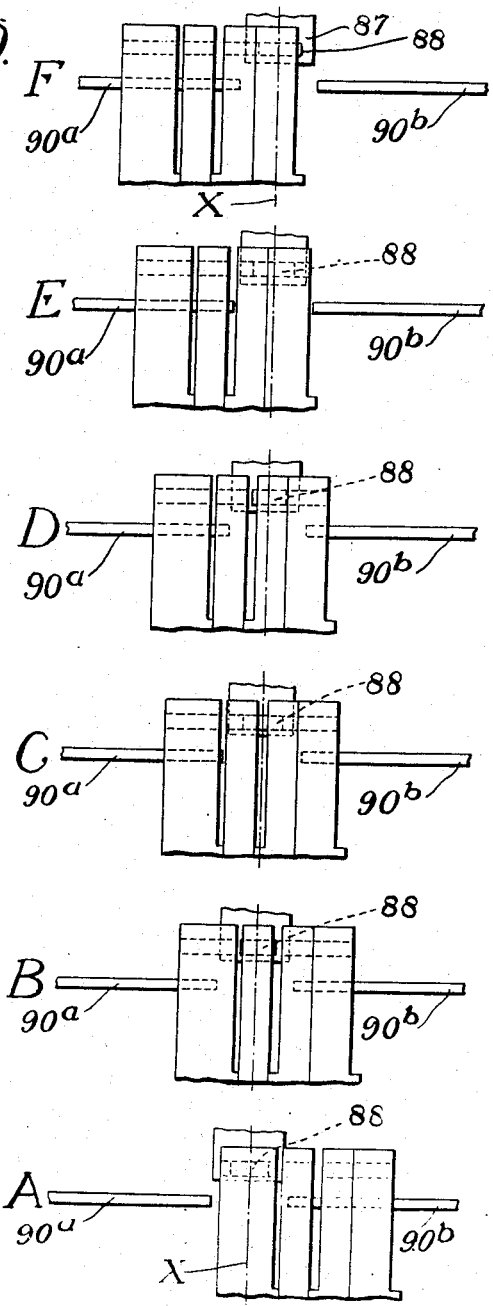

March 23, 1954

H. G. CROUCHER 2,672,975

MOLD ARRANGEMENT, ESPECIALLY FOR TYPOGRAPHICAL COMPOSING APPARATUS OR MACHINES

Filed July 27, 1951

INVENTOR
Henry G. Croucher
BY
Hall & Houghton
ATTORNEY

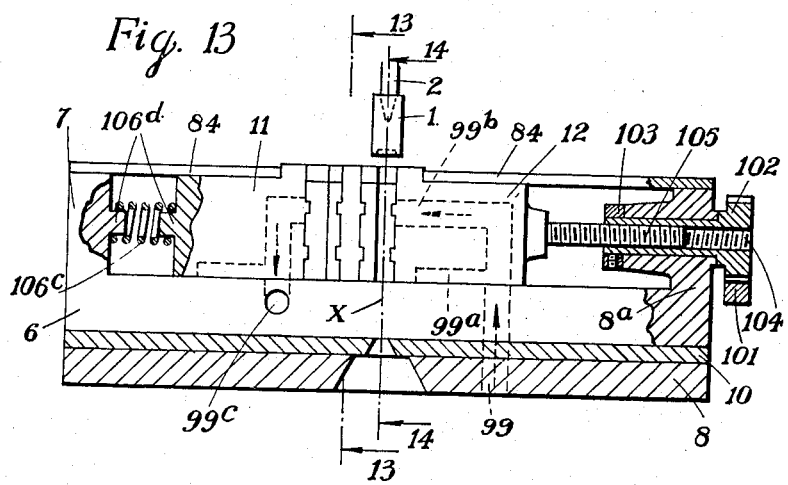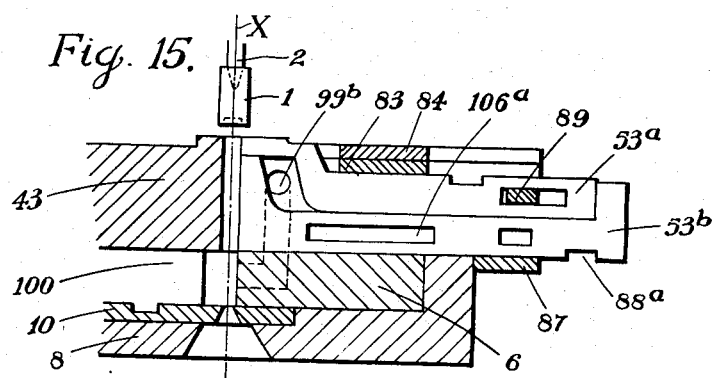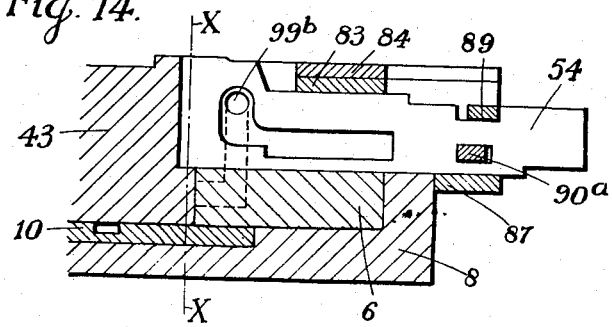

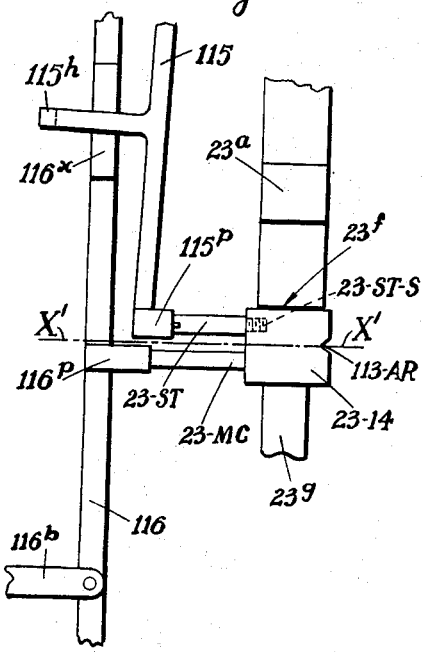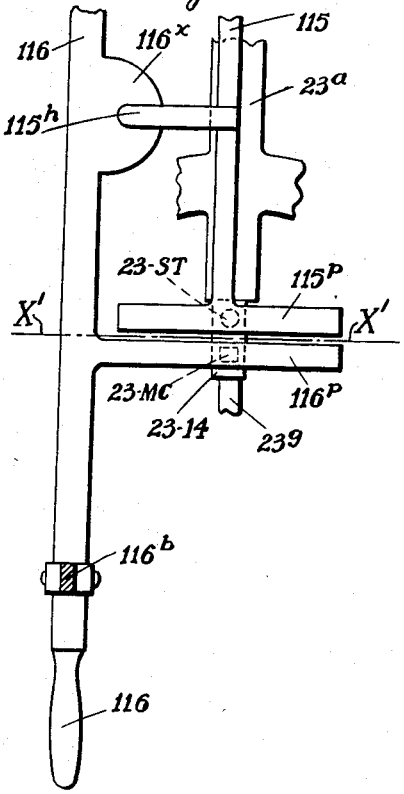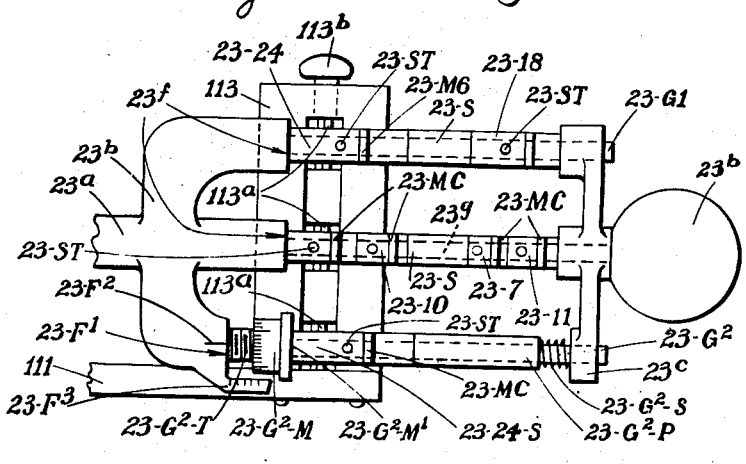

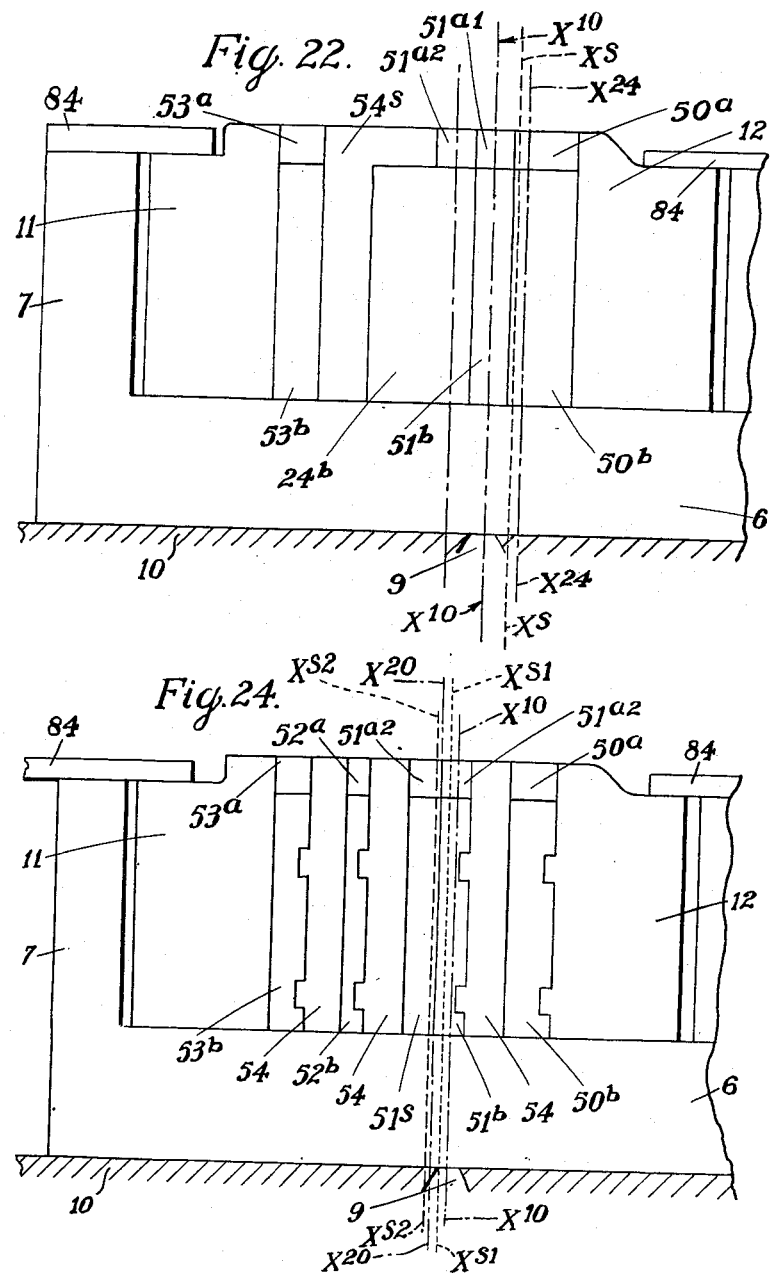

March 23, 1954
H. G. CROUCHER
2,672,975
MOLD ARRANGEMENT, ESPECIALLY FOR TYPOGRAPHICAL COMPOSING APPARATUS OR MACHINES
Filed July 27, 1951
17 Sheets-Sheet 12
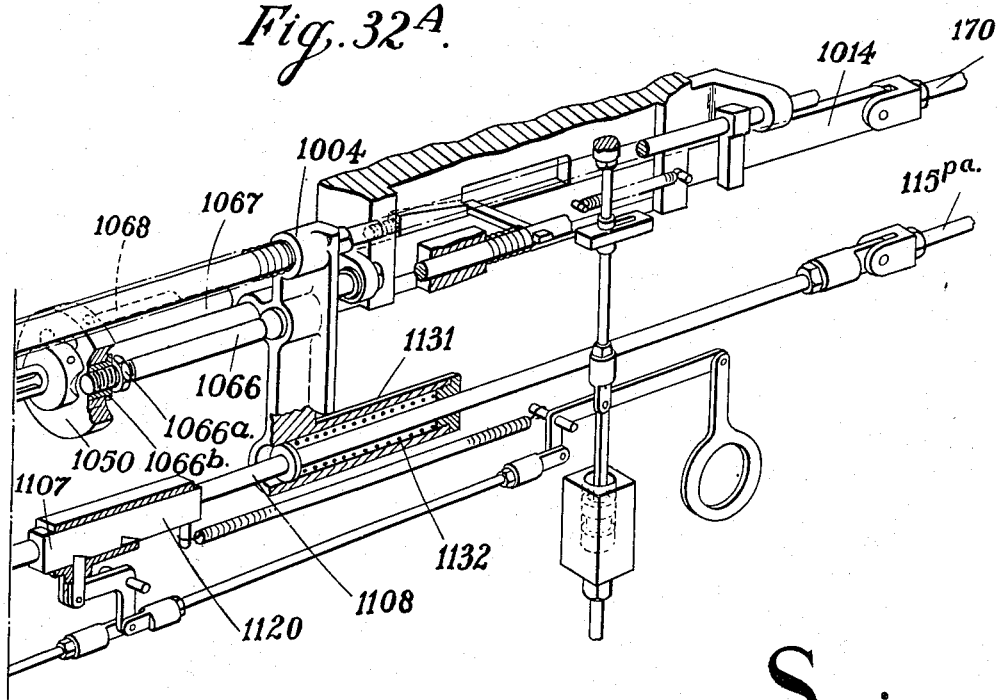
Fig. 32A.
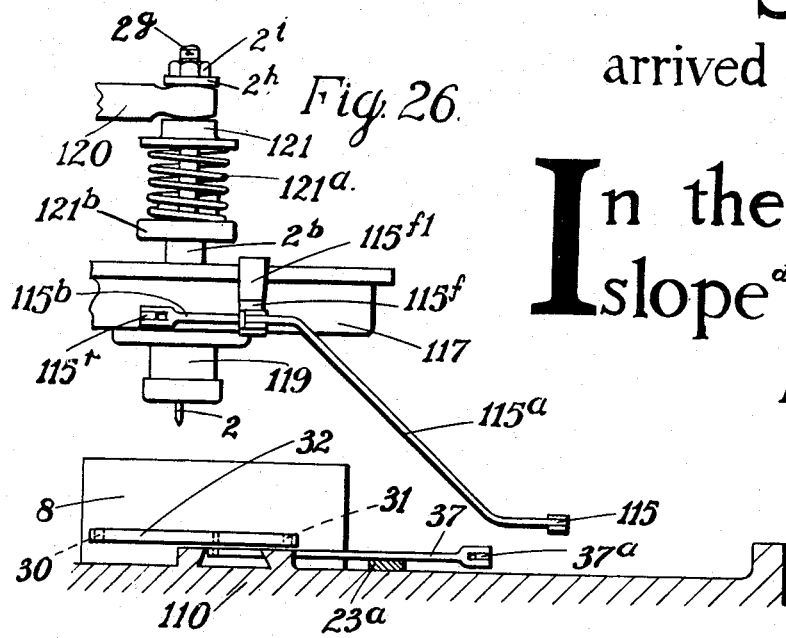
Fig. 26.
Saving
arrived at an
Fig. 23.
In the
Islope ᵈ green
Fig. 25.
INVENTOR
Henry G. Croucher,
BY
Hall & Houghton
ATTORNEY March 23, 1954
H. G. CROUCHER
2,672,975
MOLD ARRANGEMENT, ESPECIALLY FOR TYPOGRAPHICAL COMPOSING APPARATUS OR MACHINES
Filed July 27, 1951
17 Sheets-Sheet 13
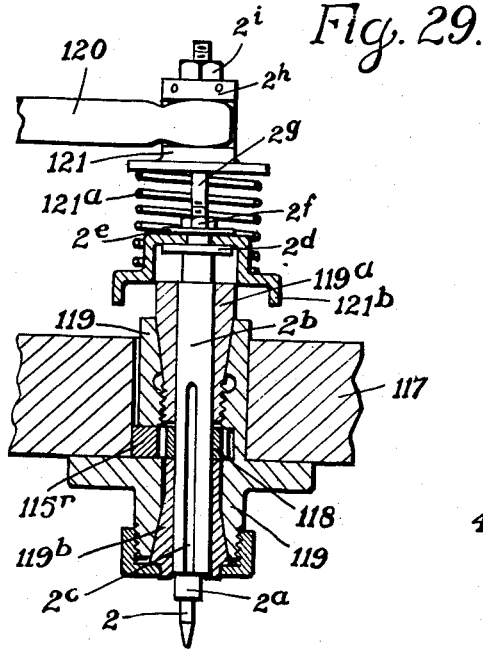
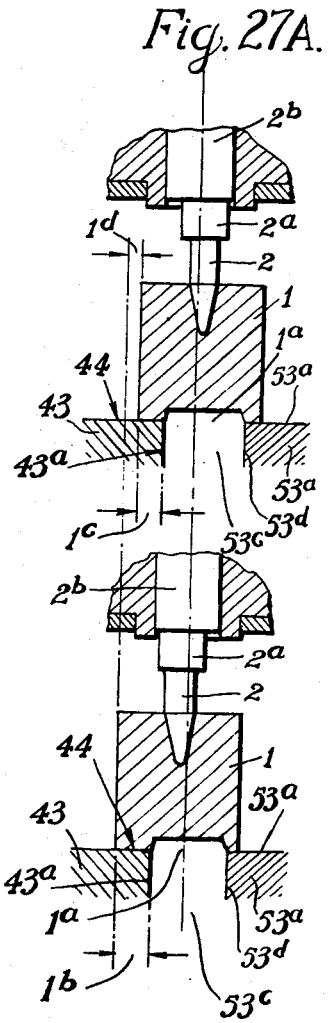
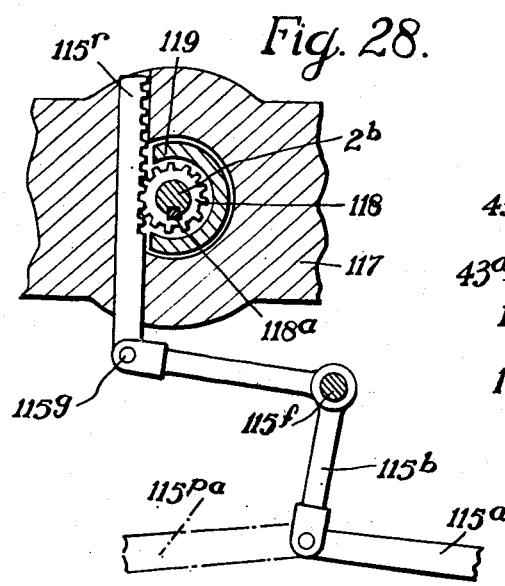
INVENTOR
Henry G. Croucher
BY
Hall & Houghton
ATTORNEY

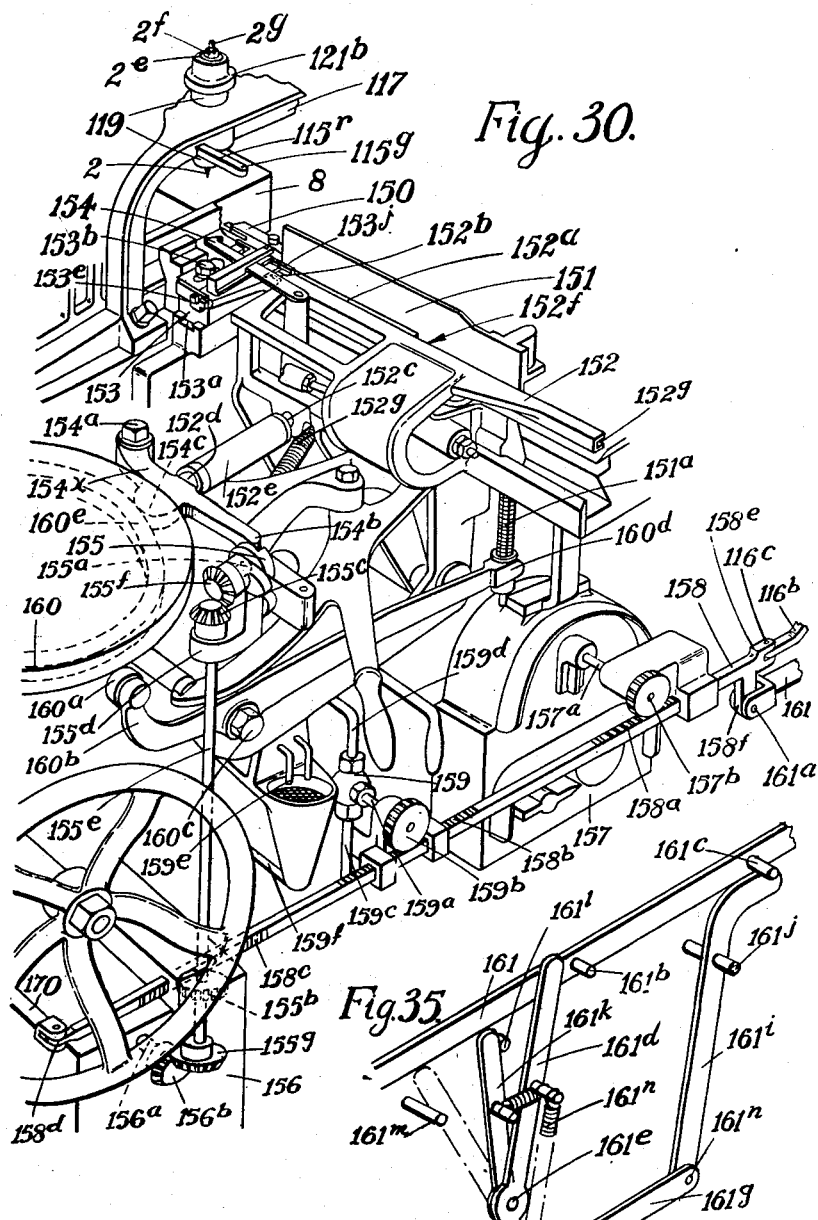

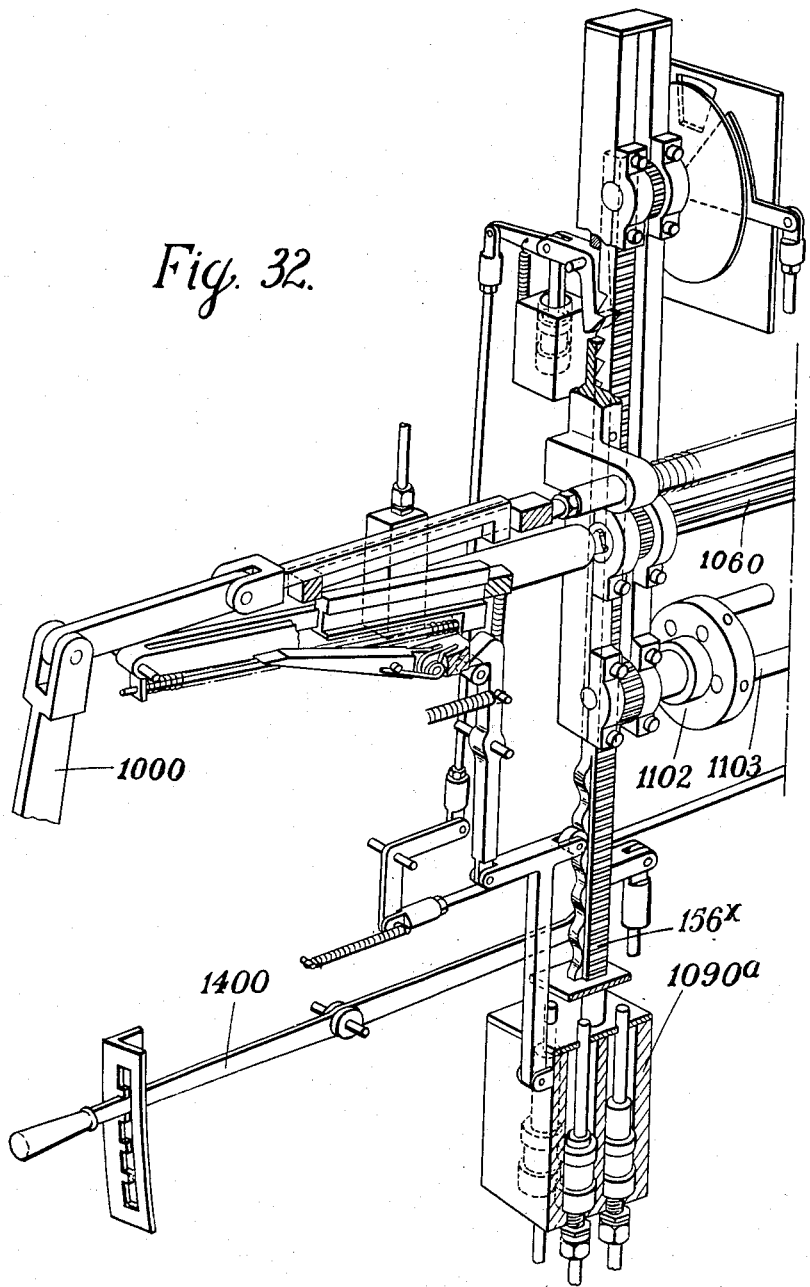

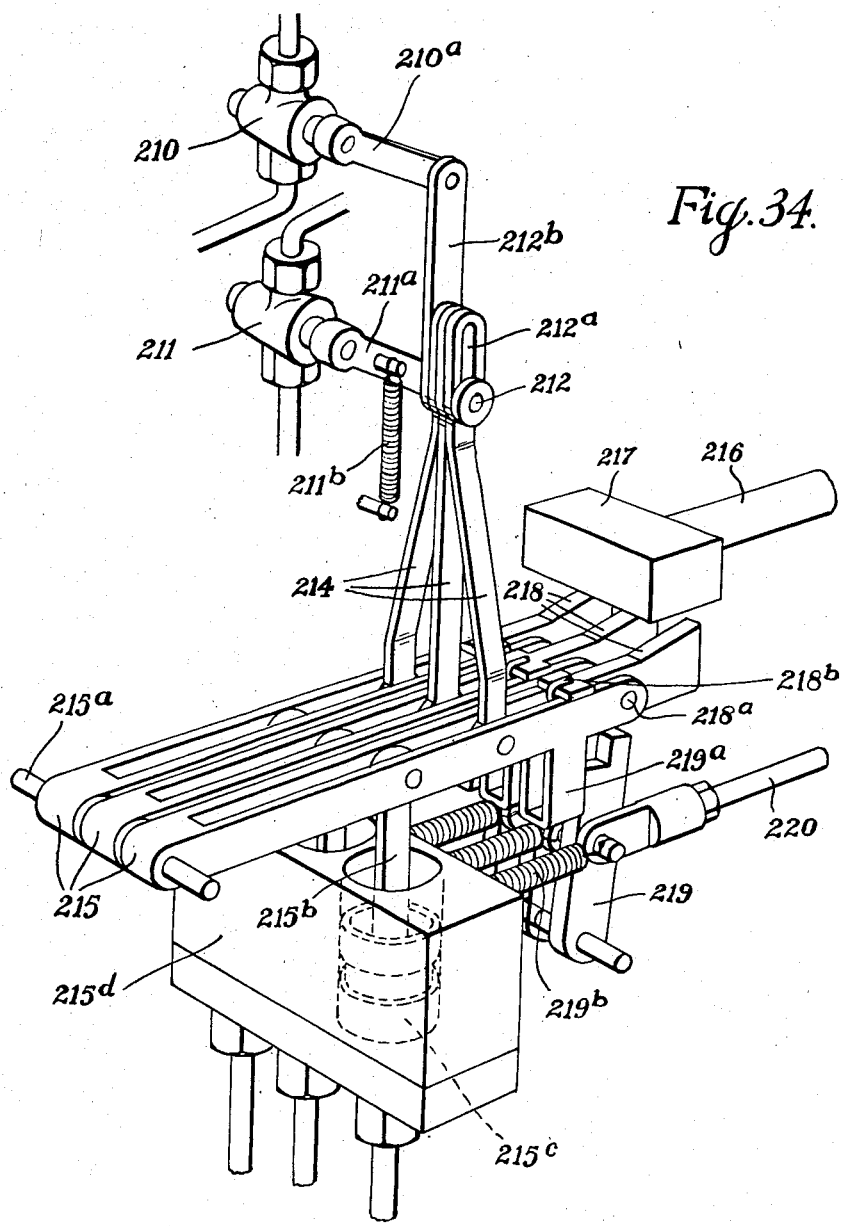

Patented Mar. 23, 1954

2,672,975

UNITED STATES PATENT OFFICE 2,672,975

MOLD ARRANGEMENT, ESPECIALLY FOR TYPOGRAPHICAL COMPOSING APPARATUS OR MACHINES

Henry George Croucher, Beccles, England, assignor to William Clowes & Sons Limited, Beccles, England Application July 27, 1951, Serial No. 238,852

Claims priority, application Great Britain August 2, 1950

50 Claims. (Cl. 199—93)

This invention relates to moulds and mould arrangements for the casting of type bodies and is especially although not exclusively concerned with moulds and mould operating and line collecting arrangements for use in composing machines or apparatus of the single type or single letter class, as for examples such as are known under the registered trade-mark Monotype.

It is an object of the invention to provide an improved mould for the casting of type and particularly high and low space type bodies in which provision is made for variation of the dimension of the mould in the direction of the depth of the type in addition to its width so that such type bodies of different point sizes may be satisfactorily cast without the necessity of providing separate suitably dimensioned moulds for this purpose. A further object is to provide a variable mould of the above character in which a satisfactory flow of casting metal to the mould face or matrix is ensured irrespective of the size to which the mould has been adjusted. A further object is to provide a mould having the above characteristics which can be employed in conjunction with existing composing machines or apparatus of the kind referred to above. A further object is to provide an adjustable mould such that when used with existing matrices on existing machines the type face is cast in the desired position on the type body so that adjustment of the machine to obtain accurate alignment is eliminated. A further object is to provide an improved mould as above in which low spaces can be cast. A further object is to provide means for effecting the adjustment of an improved mould as above under the control of record-bearing means such as by the use of perforated strip controlled pneumatic devices as used in conjunction with known composing machines. A further object is to provide improved means for effecting adjustment of the mould in conjunction with means for making up and correcting typographical matter according to patent application No. 229,342, filed June 1, 1951.

The invention comprises a mould having two or more mould dimensioning blades arranged side by side and movable between lateral guides or blocks in relation to a cross block to form a mould cavity of the desired size between the ends of the blade or blades and the cross block, and a casting metal injection inlet situated at the end of the cavity opposite to the character moulding face or matrix, in which the blades and their lateral guides are relatively displaceable transversely with respect to the injection inlet so that the latter can be disposed at or near the mid point of the variable dimension of the mould as determined by the positions of the blades in relation to the cross block.

The invention also comprises a mould having two or more mould dimensioning blades arranged side by side and movable between lateral guides or blocks in relation to a cross block to form a mould cavity of the desired size between the ends of the blade or blades and the cross block according to the number of blades withdrawn from the latter, in which each blade comprises upper and lower blade parts for the casting of high or low space type bodies as required.

The invention also comprises a mould arrangement according to either of the preceding paragraphs in which the mould dimensioning blades and lateral guides or blocks are secured to an intermediate plate, which intermediate plate is mounted for sliding adjustment upon the mould base or foundation plate having a casting metal inlet. In an alternative arrangement there is provided a stationary intermediate plate on the mould base and the mould blades and their lateral guides are adjustably arranged relatively to said plate.

The above displacements may be effected by hand or automatically, and according to a further feature of the invention, means is provided for in accordance with tower selection as described in the specification of patent application No. 229,342, filed June 1, 1951, or in accordance with sizing means as described in the specification of patent application No. 230,642, filed June 8, 1951.

According to a further feature of the invention, means is provided for regulating the factors of mould cooling, metal heating, speed of operation, or metal pump discharge, or all of them, in accordance with the adjusted mould size.

According to a further feature of the invention, means is provided for automatically adjusting the means for collecting the type and removing the collected type to the galley in accordance with the adjusted mould size.

According to a further feature of the invention, visible means are provided for showing the necessity for die case changing and for indicating the adjusted mould size.

Further features of the invention will be clear from the following descriptive examples and will be defined in the claims.

In the accompanying drawings,

Figure 1 is a front elevation, partly in section and more or less diagrammatic, of a mould constructed and arranged in accordance with the invention;

Figure 2 is a plan view of the base and intermediate plate of another mould constructed in accordance with the invention, showing the actuating and locking means;

Figure 5 is a cross section of the mould taken on the line 5—5 of Figure 3;

Figure 6 is a cross section of the mould taken on the line 6—6 of Figure 3;

Figure 10 is a diagram showing the relation of the mould blades to the stop arrangement in different positions of the blades;

Figure 13 is a front view, partly in section, of a mould showing an alternative mode of adjusting the mould blades;

Figure 14 is a side view of a mould blade separating member showing provision for cooling air flow;

Figure 15 is a side view of a mould blade showing provision for cooling air flow;

Figure 19 is a plan view to an enlarged scale of part of the mechanism of Figure 18;

Figure 20 is a side view of the mechanism of Figure 19;

Figure 21 is a side view of the controlling block mechanism;

Figure 22 is a front view, to an enlarged scale, in section, of a mould blade arrangement for the casting of large type of "stand-up" initials;

Figure 23 is a typographical illustration of such an initial;

Figure 24 is a front view, to an enlarged scale, in section, of a mould blade arrangement for the casting of large type for initials occupying two or more lines;

Figure 25 is a typographical illustration of such an initial occupying two lines of type;

Figure 26 is a side view of part of the manual control mechanism;

Figures 27A and 27B are side elevations, to an enlarged scale, in section, of an eccentric centering pin arrangement showing the pin in different positions;

Figure 28 is a sectional plan view of actuating means for the centering pin of Figures 27A and 27B;

Figure 29 is a side elevation, in section, of the mounting of the above eccentric centering pin;

Figure 30 is a general perspective view of the complete control mechanism;

Figure 33:
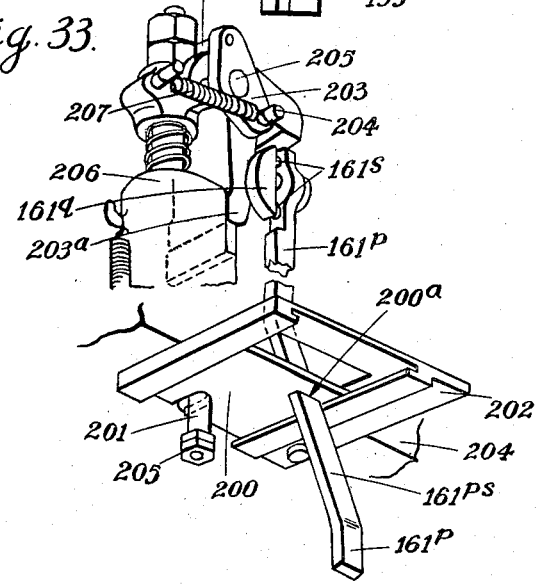

Figures 32 and 32A form a perspective view of the panel A control mechanism;

Figure 33 is an elevation of mechanism for engaging the pump latch;

Figure 34 is a perspective view of control mechanism for cooling water and air;

Figure 35 is a perspective view of release mechanism for pump latch engagement.

The invention will be described as applied by way of example to a mould having the general features of those used in single type composing machines known under the registered trade-mark Monotype. Such moulds comprise essentially a mould dimensioning blade movable longitudinally between guide blocks in relation to a cross block so that the spacing of the end of the blade from the cross block determines the width of the cast type body. The blade and guide blocks are carried by an intermediate plate secured to a foundation or base plate and an inlet aperture in the said base plate allows the casting metal to be injected into the mould space, the opposite end of which is closed by the mould face or matrix. The cross block is slidable in the foundation plate transversely with respect to the blade and carries a cam actuated jet blade which ejects the tang or solidified jet from the cast type body and is coupled to a type carrier for collecting the type when the latter is ejected from the mould.

In carrying the invention into effect according to one convenient mode as applied to a mould of the above general character and as illustrated in Figures 1 and 2 which show a mould carrying four mould blades, there is shown at 1 a matrix of known form which can be caused to descend for casting purposes and which is held clamped in casting position by a coned pin 2. The mould face is indicated at 3, this forming with the known cross block of the mould the necessary bearing surface and seal for the matrix during casting. The upper surface 4 of the usual intermediate plate, or other bed, acts as a surface for forming the type foot and constitutes a seal to confine the entering molten metal to the mould space which is defined by the withdrawn mould blade to a dimension determined by the usual known wedge and mould abutment mechanisms. The height of the type body from the foot to the type face is therefore the distance from the surface 4 to the surface 3 plus the depth of the "strike" or recessed part of the matrix as indicated at 5. This latter dimension varies with different kinds of type, being usually .05" or .065" in Great Britain and .03" or .065" in the United States of America. The intermediate plate 6 which acts as a seal for the end of the jet or tang of the cast type body is formed with an integral wall 7. The mould base or foundation plate 8 has a nozzle aperture 8a for the nozzle carrying the molten metal which is aligned with a nozzle aperture 9 in a cam plate 10 secured to the base plate 8, allowing the casting metal to be injected into the mould space in the usual manner. The cam plate 10 is provided with a cam track 10a as shown in Figure 2 for actuating the jet blade of the usual cross block for ejecting the tang or solidified jet from the cast type body. In Figure 1, the line X—X represents the theoretical datum or axis between the centre of the matrix, whatever the dimension of the latter, and the centre of the nozzle aperture 9 and all movements of mould blades as described later are relative to this datum or axis. A side block 11 is secured to the intermediate plate 6, preferably by means of screws in such a manner that it can be adjusted relatively to the cross block to ensure that the cast type shall be square. The mould blades together with blade separating members are held between the side block 11 and a clamping block 12 which can be held by means of screw, spring or other suitable means against the blades, thereby ensuring that the mould cavity shall be square with respect to the cross block.

A mould blade 14 is shown in operative position, i. e. aligned with the axis X—X, and a second mould blade 15 is shown in non-operative position. Between the blades 14 and 15 is a blade separating member 13 which is water cooled to ensure that the cast type is rapidly solidified. A cooling water supply is connected to a passage 16 in the base plate 8 which communicates with a groove 17 into which opens a passage 18 in the intermediate plate 6, the arrangement being such that the communication is maintained irrespective of the position of the intermediate plate. The passage 18 communicates through a branch 18a with the water space of the separating member 13 and similar branches communicate with the water spaces of separating members 13a and 13b and with water spaces in the side blocks 11 and 12. It will be noted that there are four mould blades, any one of which can be brought into operative position along the line X—X by an appropriate displacement of the intermediate plate 6.

Whilst the mould blades may be single blades of full type height if desired, it is preferred that each blade should consist of upper and lower blades as is well known, the upper blade, known as a cut-off blade, being adapted to form a continuation of the front face of the lower blade. Separate displacing means are provided for the upper and lower blades, and when the lower blade only is withdrawn, the upper or cut-off blade being left in position, a type body known as a low space of less than full type height will be cast. An upper or cut-off blade is shown at 15a and a lower blade is shown at 15b in Figure 1.

If desired, the mould blade means between two blade separating members, or between a separating member and a side block, may be of composite form comprising two blades side by side as shown at 19 and 20, each of which comprises upper and lower blades. Thus for example the blade 19 may be of 6 point size and the blade 20 may be of 8 point size, so that if both blades are withdrawn simultaneously a mould cavity of 14 point size is afforded. Thus if the blades 15a and 15b are of 10 point size, if the blade 14 is 11 point, and if the blade 15 is 12 point, there is provided a mould affording six type sizes, namely 6, 8, 10, 11, 12 or 14 point, any one of which can be brought into use by an appropriate displacement of the intermediate plate 6 which may be by hand or automatically as described hereinafter. By suitably positioning the intermediate plate, the necessity for aligning the matrix with the type body is eliminated, since the blades will always be positioned so that the mould space is central with the axis X—X. It will be seen that the side block 12 and the blade separating members shown in Figure 1 are provided with lateral projections, one of which is shown at 12a (for example) on the block 12. These are for the purpose of providing the conventional so-called nicks on the cast type body for use when hand setting is employed. It will be understood that the nicks as shown on the blade separating members and on the blocks 11 and 12 in Figure 1 are identical, and consequently the mould blades can be interchangeable for any desired sequence of type depth sizes. Figure 1 thus illustrates more or less diagrammatically the underlying principle of the invention, a further embodiment of which will now be described in greater detail.

Referring to Figure 2, which shows the base plate, intermediate plate, and their actuating and locking means only, the base plate 8 is provided with a displaceable intermediate plate 6, it also has secured to it a cam plate 10 having a cam track 10a therein and supporting a cross block (not shown in this figure), the cam track being for the purpose of actuating a jet blade, as in the conventional mould, for ejecting the tang or solidified jet from the cast type body. The tang is ejected through a cavity 21 by engagement with a fixed projection 22 as the cross block is moved to the right as viewed in the figure, the arrangement being such that the fixed projection 22 is not affected by any position of the intermediate plate.

Figure 7:
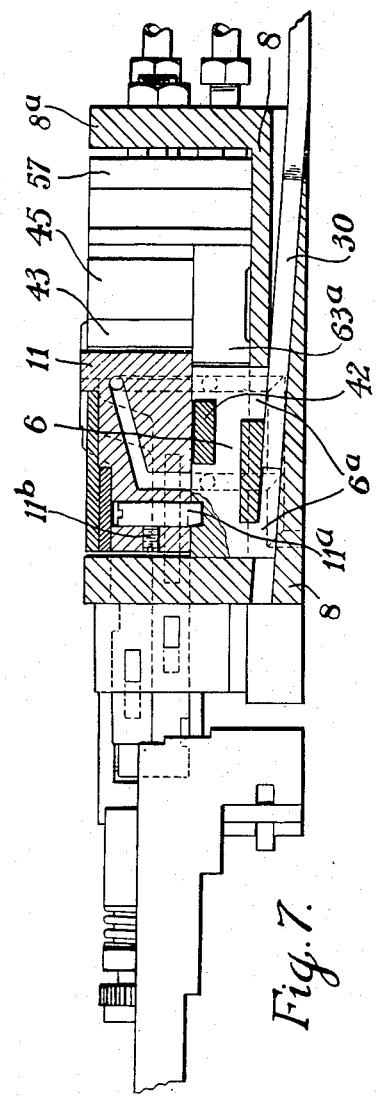
Figure 7 is a cross section of the mould taken on the line 7—7 of Figure 3.

A lever 23 for actuating the intermediate plate 6 is pivoted at 24 on the base plate 8 and may be connected by an eye 25 to any suitable operating means. A head 26 on the said crank is engaged in a complementary recess in the underside of the intermediate plate, by which means the said plate can be displaced to the right as viewed in the figure to any position between the limits constituted by end walls or stops 28 and 29, the plate being shown in its extreme left hand position. Means is provided for locking the intermediate plate 6 in its selected position and comprises guided wedges 30 and 31 inserted between the stops 28 and 29 and the ends of the intermediate plate which are shaped to conform to the wedge surfaces. The wedges are interconnected by a link 32 having slots 33 and 34 engaging pins on the wedges. The link 32 is hinged at 35 and 36 and is pivotally connected at 38 to an actuating lever 37 pivoted at 39 to a fixed bracket 40, the lever 37 being connected by an eye 41 to any suitable manual or other controlling means. With this arrangement the movement of the lever 37 is maintained in the horizontal plane whilst the wedges slide along planes which are inclined to the horizontal as seen in Figure 7, the hinge connections 35 and 36 permitting the rise and fall of the wedges.

The arrangement is such that the mould blades, which are held between the blocks 11 and 12 (see Figure 1) and against the intermediate plate wall 7, can be positioned relative to the axis X—X by actuation of the crank 23, and can be locked in any desired position by operation of the wedges 30 and 31 by means of the lever 37. To prevent lifting of the intermediate plate 6 from any cause and to prevent movement thereof other than parallel to the cross block, a retaining bar 42 extends between a wall 28 and a wall 29, this bar being accommodated in a recess in the intermediate plate 6 with its upper surface about a thousandth of an inch below the upper surface of the plate. This is shown in Figures 6 and 7. The ends of the bar 42 are extended laterally as seen in Figure 2 and are screwed to the walls 28 and 29. The cooling water passages previously referred to in connection with Figure 1 are shown at 16 and 16a, A complete mould embodying the features hereinbefore described and adapted for hand operation is shown in Figures 3 to 7. The cross block which is of conventional form is shown at 43 and is provided with a coupling 45 by which it can be slidably engaged by the type carrier of the known type casting machine as referred to previously. The coupling 45 is secured to the cross block 43 by a screw 46 when the mould is in position. A matrix bearing surface 44 of the same height as the surface 3 of Figure 1 is centrally situated in respect of the axis X—X.

Figure 3:
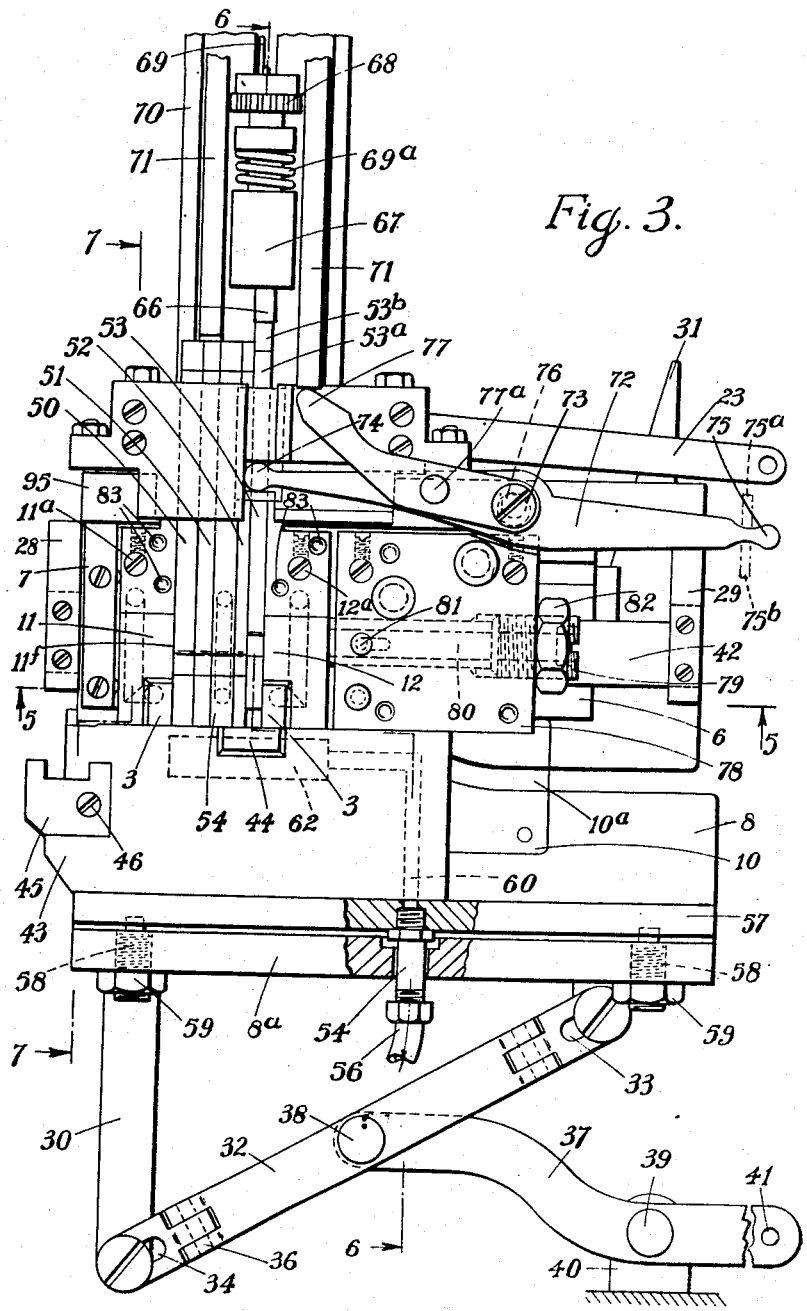
Figure 3 is a plan view of the complete mould of Figure 2 with the cover plates removed, constructed and arranged in accordance with the invention.

A blade 53 is shown in withdrawn position and is centrally aligned with respect to the said axis. Cooling is most required during the casting operation, when the cross block 43 is stationary. A supply pipe 55 to which a flexible hose 56 can be attached is mounted in a gib or guide plate 57 against which the cross block 43 is adapted to slide, the position of the said guide plate being adjustable by means of screws 58 and lock nuts 59 mounted in a wall 8a integral with the base plate 8. The pipe 55 passes freely through an aperture in the said wall. When the cross block comes to rest in the casting position as shown in Figure 3, the passage 60 is aligned with the inner end of the pipe 55 so that cooling water is supplied to a cavity 62 by which means the face of the cross block adjacent the mould space is also cooled. As shown in Figure 6, a passage 61 partly formed in a fixed block 63 extends from the cavity 62 to a pipe 64 mounted on the guide plate 57, a flexible hose 65 being provided for leading the water away.

The mould blades are shown at 50, 51, 52 and 53, and as an example the blade 50 may be fourteen point, the blade 51 ten point, the blade 52 seven point and the blade 53 eleven point. A water cooled blade separating member 54 is interposed between the blades 51 and 52 and is provided with cooling passages as indicated by broken lines. The blades comprise upper and lower blades as previously described, and as shown in Figure 6, when both blades are withdrawn the upper blade 53a is thrust against a lug 53c on the lower blade 53b by a cut-off blade actuating lever 72, both upper and lower blades being driven against the mould blade abutment slide adjusting screw of the existing machine referred to previously, and shown at 66. An operating lever 72 for the upper mould blade is actuated by the known selector levers which engage the head 75 of the lever 72 and are indicated by broken lines at 75a, 75b in Figure 3. The lever 72 is pivoted on a stud 76, and a countersunk head retaining screw 73 is provided to prevent lifting of the lever 72, the end 74 of which actuates the mould blade. A secondary lever 77 pivoted at 77a has the same function as a similar lever in the known mould. The adjusting screw 66 threaded into the block 67 has a knurled head 68 which retains it in the position to which it is moved by engagement with a small spring 69 in a well understood manner. A spring 69a is interposed between the head 68 and the block 67.

Figure 4:
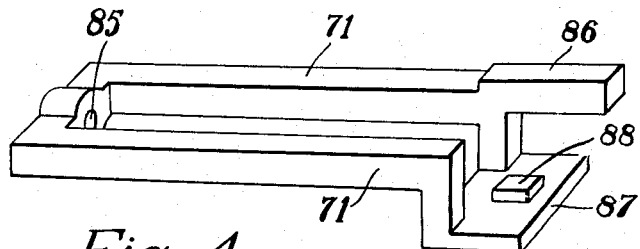
Figure 4 is a perspective view of a means for engaging a lower mould blade.

A modified coupling means is provided as shown separately in Figure 4. This comprises a double pronged member 71 to which is screwed the known mould blade operating rod, this being adapted to enter the hole 85 and to be secured by a nut (not shown). The member 71 is housed in the abutment block 70 and is accurately dimensioned so that it has no side play. A lug 88 on the member is adapted to engage the selected blade as shown in Figure 6. A floor 87 forming part of the member 71 lies immediately below the lower edge of the blade 53b. An extension 86 on the member 71 is arranged to coact with the known mould blade equalizing gear as with the existing mould blade hook. It will be understood that the mould blades can slide transversely over the lug 88, and only the slot 88a of the selected blade or blades will be engaged by the said lug.

A block 78 secured to the intermediate plate 6 serves as a bearing wall for the cross block 43 and provides a mounting for the blade clamping means, which comprises a screw 79 engaging a tubular member 80 which is slotted and guided by a screw 81. The screw 79 can be locked in adjusted position by a lock nut 82. A cover plate (not shown) is secured to the blocks 11 and 12 by screws as indicated at 83 and prevents lifting of the mould blades.

Referring to Figure 5, there is shown at 15 the cooling water passage in the intermediate plate 6 and the branch passages to the blocks 11 and 12 and the blade separating member 54. The wall 7 of the intermediate plate carries adjusting screws 7a which ensure that the assembly is square with respect to the cross block 43, the screws 7a being locked by grub screws 7b. The intermediate plate is retained in position by the bar 42 recessed therein as previously described. A cover plate 84 screwed to the block 78 retains the blocks 11 and 12 in position.

The intermediate plate 6 has depending lugs 6a and 6b which are engaged by the previously mentioned locking wedges 30 and 31. The spaces 6c indicate the available travel of the intermediate plate to the right as viewed in this figure. A slot 18b ensures a constant feed of cooling water from the passage 16 irrespective of the position of the intermediate plate. It will be seen that the lower blades are retained in position by nicks formed in the sides thereof which are engaged by projections on the blocks 11 and 12 and on the blade separating members as previously described, such projections preventing the lower blades from lifting. It will be seen that by this arrangement the type produced has nicks on both sides. Such type is unsuitable for hand composing but can be employed satisfactorily with apparatus as described in the patent specifications referred to previously.

Referring to Figure 6, it will be seen that the blades 53a, 53b are withdrawn for the casting of a wide character type, the floor for the foot of the type body being constituted partly by the moving gate block 63 of the cross block 43 and partly by the intermediate plate 6. The blade actuating lever end 74 is shown engaged in a tongued and grooved member 91 carrying a depending lug which engages the upper blade 53a. Further details of the plate 91 will be given later. A stop 89 is provided to permit withdrawal of the mould blades for a distance of twenty-four points but prevents further movement. This stop passes through all the mould blades as shown in Figure 8.

Figure 7 shows adjusting means for the mould blocks 11 and 12 and also the arrangement of the clamping wedges 30 and 31 for inclined travel. To ensure that the type bodies are accurately square the blocks 11 and 12 and the cross block 43 must be flush. The adjusting means comprise an eccentric dowel 11a in the block 11 and a similar dowel (not shown) in the block 12. These dowels may be locked by grub screws 11b as shown.

Figure 9:
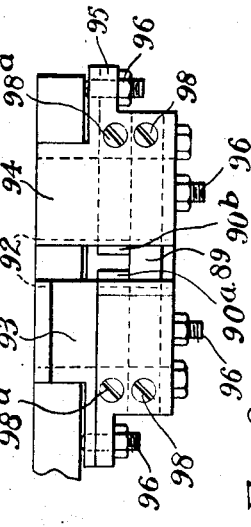
Figure 9 is a plan view of the stop arrangement of Figure 8.
Figure 8:
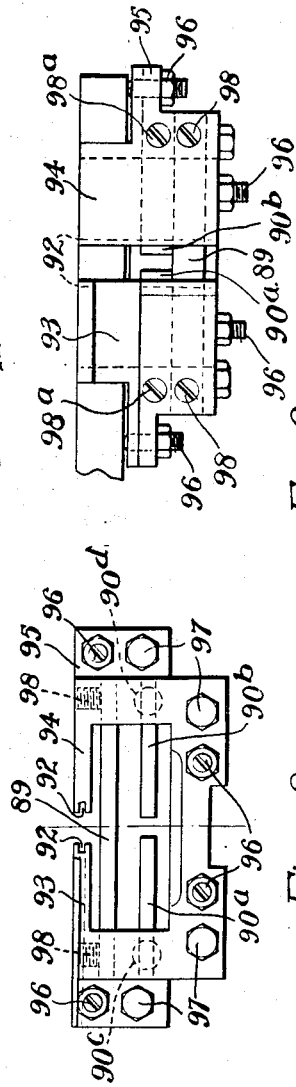
Figure 8 is an end view of the mould blade stop arrangement.

Figures 8 and 9 show a plate 95 which is adjustably attached to the rear walls of the base 8 of the mould as seen in Figure 3 and is therefore in fixed relation to the nozzle entrance and the X—X axis as previously described. The plate 95 carries bars 89, 90a and 90b, so that the space between the latter two bars permits freedom of blade movement only to such mould blade or blades which can pass through it. Adjusting bolts 96 are provided having lock nuts so that the plate can be adjusted so that the ends of the mould blades align with the mould blocks when the blades are in either their inoperative or closed positions. The plate is attached to the mould base 8 by bolts 97. The bar 89 prevents movement of the mould blades beyond the line of the side blocks. Grub screws indicated at 90c and 90d may be provided for adjusting the stop bars 90a and 90b for wear. In Figure 9 there is shown the relative position of the through bar 89 common to all the blades, whether in operative position or not, the bars 90a and 90b retaining the non-operative blades in position to afford a wall for the mould cavity. The tongues formed on the plate 91 are indicated at 92, and the said plate is recessed as previously described to receive its actuating lever 74.

In Figure 10 there is illustrated diagrammatically the manner in which the stop bars 90a and 90b operate in relation to the X—X axis, the blades being shown in plan. The blades are shown in relation to the lug 88 of the coupling member of Figure 4. Four blades are shown, which may for example be twelve point, six point, eight point and ten point reading from left to right. With the blades in the extreme right hand position as shown in the diagram A, the twelve point blade is in operative position and central with respect to the X—X axis. It will be understood that the stop bars 90a and 90b can be adjusted to give any desired opening between their ends. The three blades to the right of the thus positioned twelve point blade are held by the stop bar 90b and hence cannot be displaced. In the diagram B the six point blade is operative, the twelve point blade being held by the stop bar 90a and the remaining two blades to the right being held by the stop bar 90b. In the diagram C the six point and eight point blades are positioned together in central relation to the X—X axis, thus giving a mould dimension of fourteen points, it being noted that the actuating lug 88 has an adequate bearing surface on both blades. The outer blades at either end are held by the stop bars. In diagram D the eight point blade is positioned for operation, the remaining blades being held by the stop bars. In diagram E the eight point and ten point blades are positioned together, affording a mould dimension of eighteen points. In the diagram F the ten point blade is positioned for operation, the remaining blades being held by the stop bar 90a. It may be noted that the twelve point, eight point and ten point blades are reduced in thickness at the ends engaged by the coupling lug 88, thereby permitting the space between the ends of the stop bars 90a and 90b to be reduced to a minimum.

Figure 11:
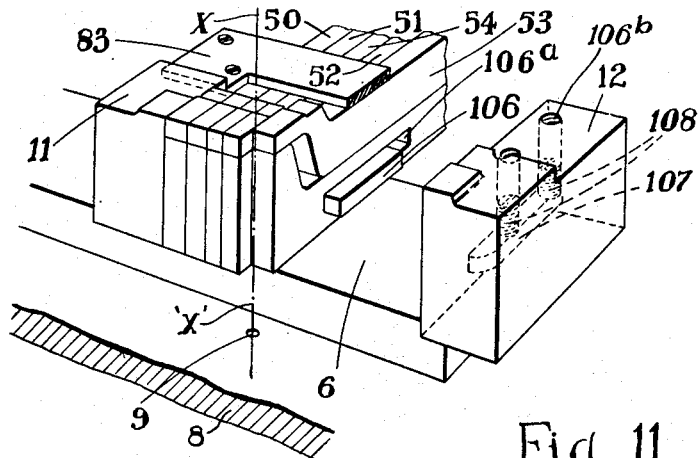
Figure 11 is a perspective view showing an alternative arrangement of mould blades and means for retaining them in position.

As previously described and shown in conjunction with Figures 1 and 5, the mould blades are formed with nicks engaged by corresponding projections on the adjacent members, which may be either blade separating members or the mould blocks 11 and 12, thereby preventing the lower blades from lifting during operation. An alternative arrangement having the same purpose is shown in Figure 11. The blades 50, 51, 52 and 53 and the blade separating member 54 are assembled between the mould blocks 11 and 12 and lie beneath a cover plate 83 secured by screws to the said blocks. The lower blades are formed with slots as shown at 106a through which passes a retaining bar 106 the ends of which are mounted in grooves in the blocks 11 and 12, one of said grooves being shown at 107. The slots 106a are of sufficient length to permit the required withdrawal movements of the blades. The bar 106 is secured in position by grub screws 108 which allow wear to be taken up.

Figure 12:
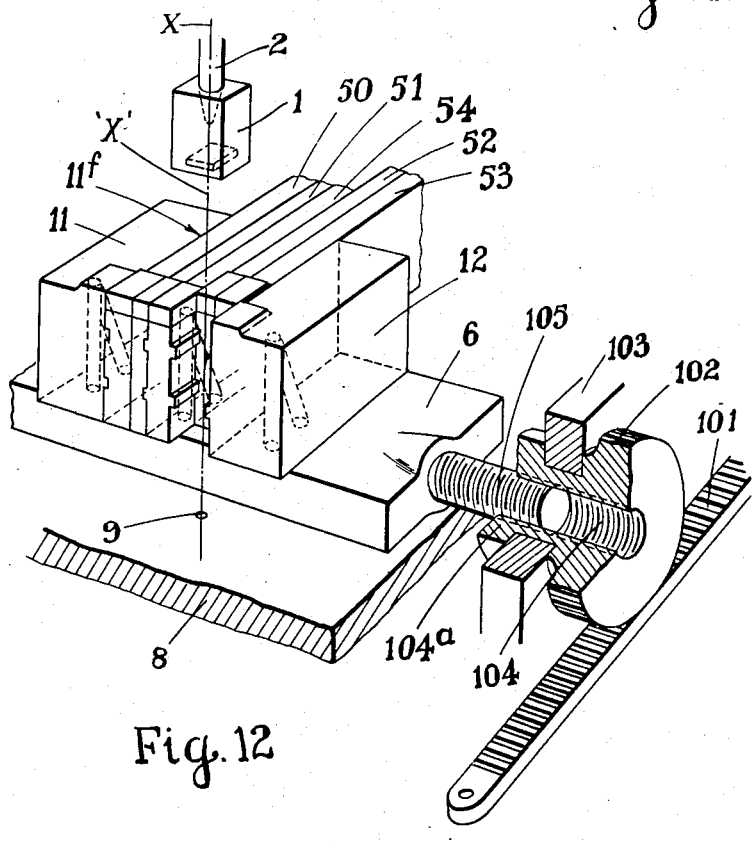
Figure 12 is a perspective view showing means for adjusting a mould according to the invention and suitable for operation by automatic means.

A convenient means for adjusting a mould according to the invention and suitable for actuation by automatic means is shown in Figure 12. The blades and blade separating member are assembled between the mould blocks 11 and 12 on the intermediate plate 6, the matrix 1 and its coned rod 2 being shown located on the X—X axis passing through the metal injection orifice 9 in the base plate 8. A threaded rod 105 is secured to the intermediate plate 6 and engages an internal thread 104 in a nut 104a rotatably mounted in a bracket 103 so that it cannot move endwise. A pinion 102 integral with the nut meshes with a toothed rack 101 which is guided for longitudinal displacement and has an eye by which it can be connected by suitable linkage to the panel A mechanism to be described hereinafter. Actuation of the rack 101 will thus determine the positioning of the selected blade or blades relative to the X—X axis.

An alternative arrangement for enabling the selected mould blade or blades to be positioned is shown in Figure 13. The mould base plate 8, the cam plate 10, the intermediate plate 6 with its wall 7 and a wall 8a secured to the base plate are stationary. In the said wall 8a is rotatably mounted an internally threaded (104) bushing 103 integral with a pinion 102 meshing with a toothed rack 101. A threaded rod 105 engages in the bushing thread 104 and is connected to the mould side block 12. A series of strong springs, one of which is shown at 106c, are located between the second mould side block 11 and the wall 7 of the intermediate plate 6, these springs being located on bosses 106d. It will be clear that longitudinal displacement of the rack 101 will effect the desired displacement of the blades relative to the X—X axis. The arrangement also provides for air cooling in place of water cooling. An air inlet 99 in the base plate 8 communicates with a passage in the intermediate plate 6 leading to a system of grooves 99a and 99b by which the air can pass through the blades and blade separating member and is removed through a passage 99c. Figure 14 shows the separating member 54 with its air passage 99b. A stop 90a prevents the member 54 from moving away from the line of the wall of the cross block 43, and a stop 89 prevents its movement out of line with the side walls. Figure 15 shows upper and lower blades 53a and 53b in relation to the cross block 43 in casting position, the passage 99b permitting a flow of cooling air through the blade. The arrangement is such that air cooling can take place when the blades are closed against the cross block.

Figure 16:
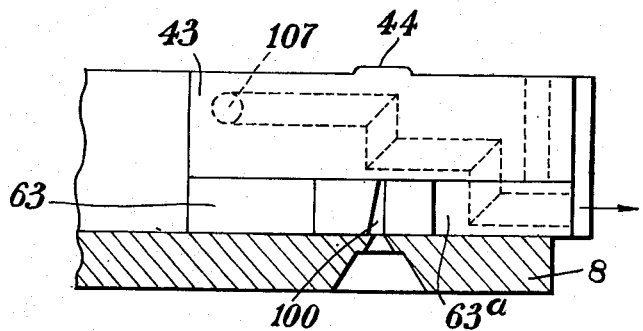
Figure 16 is a front view of a cross block showing provision for air cooling.
Figure 17:
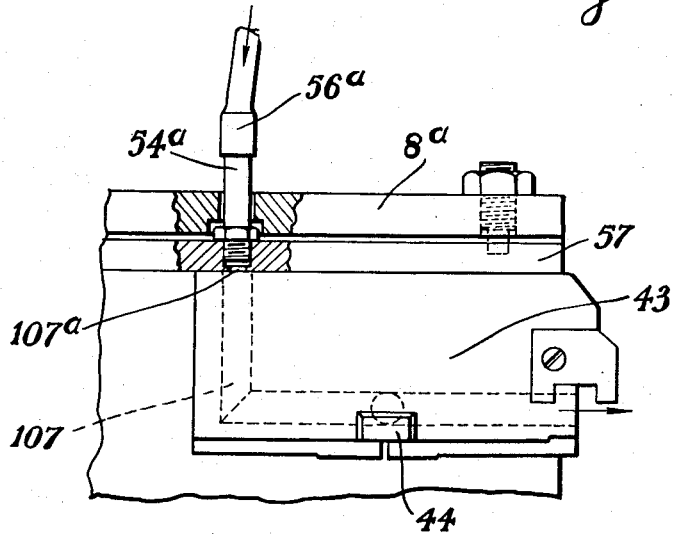
Figure 17 is a plan view of the cross block of Figure 16.

A convenient means of providing air cooling for the cross block 43 is shown in Figures 16 and 17. An air supply hose 56a is connected to a pipe 54a passing through an aperture in the wall 8a and mounted in the cross block guide plate 57. A port 107a in the plate 57 is aligned with a passage 107 in the cross block 43 when in position for casting, the cooling air passing through the cross block and being discharged as indicated by the arrow. When the cross block is moved, as for removing the tang from the cast type and for ejecting the type into the type carrier, the port 107a is closed by the plain face of the said block 43 so that the cooling air is interrupted. The gate blocks are shown at 63 and 63a.

It will be appreciated that the above air cooling arrangement may be employed instead of the water cooling of previous examples described above.

Figure 18:
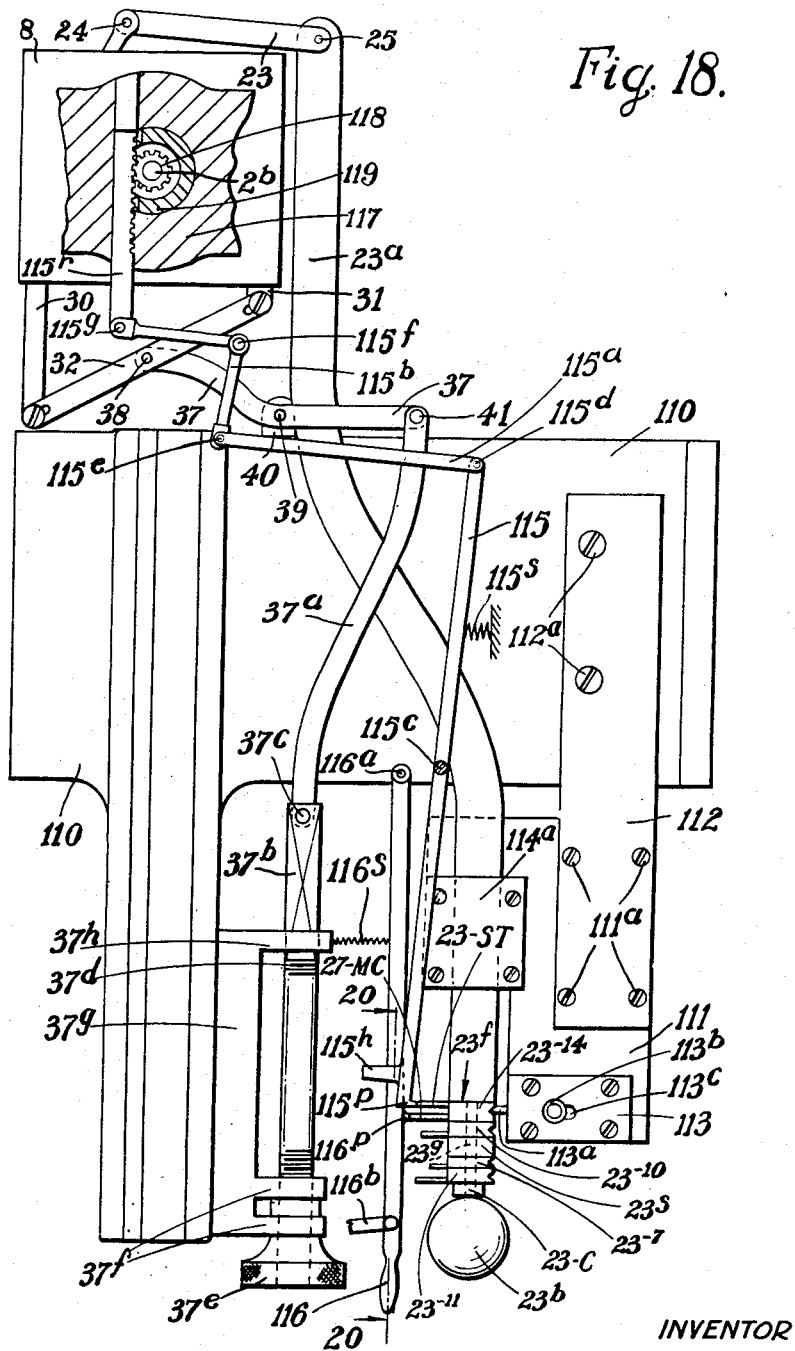
Figure 18 is a plan view of a mechanism for manual control of the mould adjustments.

A convenient mechanism for manually controlling the mould adjustments when using the improved mould on the known casting machine, or when used in conjunction with apparatus for making up pages of type as described in the specification of patent application No. 229,342, filed June 1, 1951, is shown in Figure 18. The mechanism is mounted on the galley support 110 of the known machine referred to previously, and to this is secured a plate 112 by screws 112a. A second plate 111 forming a platform is secured to the plate 112 by screws 111a. A housing 114a mounted on the plate 111 forms a bearing or guide for a drive bar 23a for actuating the mould blades. This bar is connected by a pin 25 to the control lever 23 shown also in Figures 2 and 3. The opposite end of the bar 23a is reduced at the point 23g and 23f, the reduced portion being shown at 23g and upon this reduced portion are positioned setting blocks 23—14, 23—10, 23—7 and 23—11 each of which has a lateral recess for a clamping tooth 113a. Further blocks 23s and 23c are also mounted on this reduced portion as hereinafter described. A handle 23b is threaded upon the end of the bar and clamps all the blocks against the shoulder 23f of the reduced bar portion. The bar 23a is held in adjusted position by a spring loaded tooth 113a housed in a block 113, and can be withdrawn by a finger piece 113b sliding in a slot 113c. The dimensions of the setting blocks 23—14, 23—10, 23—7 and 23—11 are proportional to the dimensions of the mould blades shown in Figure 3 and are related to the throw of the lever 23 so that the respective blades will be correctly positioned in relation to the X—X axis when the corresponding block is engaged by the tooth 113a. The block 23s is dimensioned to correspond to the mould blade separating member and acts merely as a packing piece between the blocks 23—10 and 23—7.

For clamping the intermediate plate 6 in its adjusted position there is provided a lever 37 having a fulcrum at 39 and pivotally connected at one end to a compensating bar 38 which actuates the wedges 30 and 31 previously described. A drive bar 37a is pivotally connected at 41 to the further end of the lever 37. The bar 37a is pivotally connected at 37c to a square section bar 37b slidable in guides 37f and 37h on a mounting 37g. The end of the bar 37b is formed as a threaded rod 37d which is engaged by a knurled nut 37e rotatably mounted in the guides 37f. Thus by rotating the nut 37e the mould intermediate plate can be locked or unlocked.

A lever 116 is pivoted at 116a to the galley support 110 and carries a stop projection 116p which bears against the projections shown on the previously described setting blocks on the bar 23g, the lever being loaded by a spring 116s. A connection 116b on the lever 116 leads to a rack mechanism to be described hereinafter. A lever 115 is pivoted to the galley support 110 at 115c and has a depending lug 115h which can be engaged by the lever 116 when the latter is moved to the left. As shown in Figure 19 the said lever 115 has a projection 115p which is adapted to engage one of the studs 23–ST on a setting block such as 23—14, being held against the same by a loading spring 115s. The further end of the lever 115 is connected to a bar 115a which is itself connected to a bell crank 115b pivoted at 115f and connected to a toothed rack 115r. The setting block 23—14 (and the other corresponding setting blocks) carries a projection 23–MC, the length of which varies according to the block, and this projection controls the setting of the line collecting and other mechanism as described later. The arrangement is such that the connection 116b on the lever 116 will be displaced a predetermined amount depending upon the length of the projection 23–MC which varies according to the width of the setting block. The lever 115 has two positions only, one as shown in which it is held by a stud 23–ST on the setting block 23—14, or if it abuts the side face of the block. These studs are for the purpose of ensuring correct alignment of the mould matrix as will be explained hereinafter. Figure 20 illustrates the manner in which the depending lug 115h on the lever 115 is engaged by an upstanding projection 116x on the lever 116 when the latter is manually operated during the selection and positioning of the mould blade or blades. It is to be noted that the striking faces 115p and 116p on the respective levers are of extended form and are situated on either side of an axis X'—X' defining the centre line of the locking tooth 113a, the arrangement being such that even a block corresponding to a five point mould blade can be engaged by both such striking faces.

The arrangements shown in Figures 18, 19 and 20 comprise setting blocks corresponding to single mould blades only. An arrangement adapted for the control of two mould blades together is shown in Figure 21 which includes three different modes of control. The drive bar 23a is formed with a head 23b for carrying three series of setting blocks. Considering the centre series shown, the setting block 23—14 carries a projection or post 23–ST, and tapped holes for receiving similar projections are indicated on the setting blocks 23—10 and 23—11. The locking tooth 113a is spring loaded and can be retracted by the finger piece 113b out of engagement with the central series of setting blocks. Similar and independent locking teeth are provided for the two outer series of setting blocks, operated by the same finger piece 113b.

The upper series of setting blocks shown in Figure 21 are dimensioned to correspond to two mould blades when withdrawn simultaneously. Thus for example the setting block 23—24 of the upper series corresponds to a fourteen point blade and a ten point blade when used together, the simultaneous withdrawal of the blades affording a twenty-four point moulding cavity. The upper series of blocks shown are mounted on a reduced section bar 23–G¹ which accommodates the above-mentioned block 23—24, a separator block 23–S, and an eighteen point block 23—18. These are held in place by a clamping member 23c held in place by the threaded handle 23b. The machine controlling projections such as 23–MC are longer than those of the central series of setting blocks so that the latter will be cleared by the projections 115p and 116p on the levers 115 and 116 when 23—24 or 23—18 are operatively positioned.

When the larger type is employed for initials, as for example the first letter of the first word of a chapter, the lower edge of the initial should be in line with the lower edge of the line of the type used for this word, generally known as the lower X line. The twenty-four point face of a matrix having a dimension of .4" by .4" has a centrally situated cone which ensures the alignment of the matrix. When a large initial is used, the required alignment is generally obtained either by filing down the type body or employing a special fount of type. In accordance with the present invention, means is provided for displacing the blades or the intermediate plate of the mould by an amount sufficient to ensure the casting of a large initial faced type which will give the desired alignment. This can be obtained by the lower series of setting blocks shown in Figure 21. The setting blocks are secured against an adjustable face (instead of the fixed face 23f of the other series) in the following manner. A reduced section bar 23-G² is formed with a micrometer thread 23-G²T upon which is a knurled micrometer head 23-G²M which can be adjusted along the rod. An extension on the lower arm of the bar 23b carries a scale 23F³ for the micrometer head. Thus by adjusting the latter, a twenty-four point block, as 23—24S for example, having a locking tooth recess 113-AR can be adjusted the desired amount from the position corresponding to a central position of the mould blade or blades with respect to the X—X axis. A packing piece 23-G²P is placed against the setting block and a spring 23-G²S is interposed between the said packing piece and the clamping member 23c. Instead of the micrometer head, packing pieces or shims may be employed to vary the position of the block 23—24S. An example of an aligned initial is shown in Figure 23.

The invention also provides means whereby type may be cast to produce abnormal alignments of letters or figures. The mould arrangement shown in Figure 22 is generally similar to the arrangements previously described and the same reference characters are employed, and is adapted for the casting of large single line initial type from standard matrices having the strike aligned in the usual central manner. The blades 53a and 53b are of eleven point size, the blades 50a and 50b are of fourteen point size, and the blades 51a¹ and 51a² are of ten point size, whilst 54s is a cooled member having a fourteen point overhanging portion of upper blade width. Referring to Figure 23, if the S character face is cast on a twenty-four point body, then the smaller character faces must be cast on the same sized bodies, otherwise the smaller type would not be adequately supported in the known line collecting means. The smaller text "arrived at an" is cast with blades 51a¹ and 51b which are aligned centrally on the $X^{10}$—$X^{10}$ axis in the manner already described heretofore. The large initial S is cast with the blades 50a, 50b and 51a¹, 51b in combination, but these blades are not centrally aligned with the $X^{24}$—$X^{24}$ axis which is the normal alignment for the twenty-four point matrix, but are aligned on a displaced axis shown at Xs. This is effected by suitable displacement of the twenty-four point setting block 23—24S as described in connection with Figure 21. The text matter "aving" is cast by means of a lower blade 24b of twenty-four point width in order to keep the same body size as the initial as explained above. This blade comprises a normal twenty-four point lower blade with a ten point upper blade 51a². The blade separating member 54s has an overhanging part of fourteen points in width. The ten point upper and lower blades 51a¹ and 51b together constitute a normal ten point blade for casting purposes. When the space between the separating member 54s and blades comprising 51a², 51a¹, 50—51b, 51b, 50a and 50b is displaced by the intermediate plate 6 and its wall 7 to align with the axis Xs it is possible to operate both the upper blades 51a¹ and 50a by the actuating lever 74 (Figure 3) and thereby obtain a twenty-four point upper opening. Also the lower blades 51b and 50b can be withdrawn by the coupling lug 88 to obtain a twenty-four point lower opening. Thus when a matrix for a large type initial is aligned with the Xs—Xs axis, the type face will be displaced on the type body to the special alignment required to align with the smaller type lower "x" line, as shown in Figure 23.

In order to produce an initial generally known as a "drop line" as illustrated in Figure 25, the mould arrangement shown in Figure 24 is employed. This arrangement is generally similar to that of Figure 1, and the blades have conventional nicks as previously described. The mould side block 11 adjustably abuts the wall 7 of the intermediate plate 6 and next to this block is an eleven point blade 53a, 53b, comprising upper and lower blades. A cooled separating member 54 abuts the above blade, next which is a seven point blade 52a, 52b with a similar cooled member 54 adjacent to it. Two ten point upper blades 51a¹ and 51a² are arranged side by side. Below the left hand blade 51a¹ is a ten point spacing piece 51s which may conveniently form part of the adjacent blade separating member 54. Below the right hand upper blade 51a² is a ten point lower blade 51b, these being flanked by a further cooled member 54 and two fourteen-point blades 50a, 50b.

The normal ten point alignment is shown at $X^{10}$—$X^{10}$ central through the blades 51a¹ and 51b. The normal alignment of a twenty-four point matrix on a twenty point body is indicated centrally between the blades 51a¹ and 51a² at $X^{20}$—$X^{20}$ but to align the large type face with the smaller type face an alignment indicated at $Xs^2$—$Xs^2$ is required.

Thus when a matrix for a large type initial is aligned with the $Xs^2$—$Xs^2$ axis, the type face will be cast with a ten point overhang on its left side as shown in Figure 24, the thickness of such overhang being the thickness of the upper blades, and its width being that of the character required, whilst the body is of ten point width only, occasioned by the cavity produced when the blade 51b is used. The lever 74 opens both the upper blades 51a¹ and 51a² whilst the projection 88 is only engaged with lower blade 51b, the spacing piece 51s being formed as shown in Figure 14 without any engaging recess.

It will be evident from the above that with the intermediate plate centered on the $X^{10}$—$X^{10}$ axis the small text shown in Figure 25 is obtained centrally in the manner previously described, whilst the intermediate plate displaced as described above the initial character may be cast on the ten point body, aligned as required and having an overhang on its left side of ten points, which overhang is the thickness of the upper blades and the width thereof is that of the character required, which overhang is underpinned by low blade height spaces to prevent spoilage.

A two-line initial produced by a type cast in the above described mould is shown in Figure 25. Whether this overhang is on the left or the right depends upon the type of perforated strip used, which governs the casting order.

In the existing composing machine as known under the registered trade-mark Monotype, the type for the lines is cast in reversed order. Thus the operator is required to depress a key for positioning the matrix used for the initial letter when setting the second line, since the overhang will be over the following line. As seen in Figure 25, the overhang is adjacent the letter $n$. A normal low space will be needed from the line end as cast to underpin this overhang, this space being the width of the initial. If the controlling perforated strip in the machine is produced by a keyboard mechanism according to the specification of patent application No. 229,341 the casting of type proceeds in the reverse order, i. e. from the first line onwards. In such circumstances the initial will be placed in the first line and the underpinning space in the second line.

If required, an italic lower case $d$ as shown can be cast by suitably displacing the mould space in a similar manner as is employed for initials. Thus if the required italic face is of five point size, this can be produced with a standard central strike five point matrix with its X—X axis disposed at $XS^1$ which causes the face to be relatively displaced on the body as shown in Figure 24.

In Figure 26 there is shown the interconnecting linkage between the setting mechanism shown in Figure 18 and the existing casting machine. The lever 115 is connected by the link 115a and the crank 115b to the rack 115r which effects adjustment of the centering pin as described hereinafter. The vertical relationship of the bar 37a for operating the clamping wedges and the driving bar 23a for the mould blade actuating lever is also shown. Other parts shown will be referred to in the following description.

When matrices of twelve point size or larger are employed in conjunction with matrices of eleven point size or smaller in the same matrix case, it is necessary that the position of the matrix should be varied when seated on the mould in order to ensure lateral alignment of the type face. To provide for this requirement and to avoid the use of non-standard matrices, the arrangement shown in Figures 27A, 27B, 28 and 29 is employed. The coned end 2 which centres the matrix 1 is mounted in a centering pin 2b, between which and the coned end there is a shoulder 2a eccentric with respect to the pin 2b. The mould blade 53a is shown in withdrawn position to form a mould space 53c, the cross block being shown at 43 with its face 43a defining one side of the type body. The opposite side of the type body is defined by the blade face 53d. In Figure 27B, the matrix is held with the coned end 2 positioned to the left of the axis of the pin 2b and the dimension 1b is the amount by which the matrix overhangs the cross block 43; this dimension may be .035″ for an eleven point matrix. In the diagram A the pin 2b has been rotated by 180° so that the overhang 1c is reduced to .025″, the .01″ difference being shown at 1d, which is the difference in the positions of the striker on eleven point and smaller matrices and twelve point and larger matrices of known type. The mould blade 53 can thus be withdrawn further if desired to afford a larger mould space 53c. The required rotation of the pin 2b is effected by the means shown in Figure 28. The link 115a, shown also in Figure 18, actuates the rack 115r through the crank 115b. The rack 115r meshes with a pinion 118 on the pin 2b. A housing 119 for the assembly is secured to a bridge member 117. Referring to Figure 29 which shows the complete matrix centering assembly, a member 119 having a pair of conical or tapered bores is bolted to the bridge member 117. A pair of split tapered members 119a and 119b fitted within the bores of the member 119 are adapted to guide the centering pin 2b in its vertical travel. A pinion 118 on the pin 2b is meshed with the rack 115r previously described and has a key 118a slidable in a slot 2c in the pin. The arrangement is otherwise the same as that on the existing casting machine. A cam member 121b, corresponding to a similar member on the existing machine, is freely held between a shoulder 2d on the pin 2b and a washer 2e, being hooked in position by lock nut 2f, the adjusting nuts 2i and 2h and the lever 120 being the same as on the known machine. The spring retaining plate 121 is held against the lever 120 and the spring 121a is not affected by the angular adjustment of the pin 2b.

Figure 31:
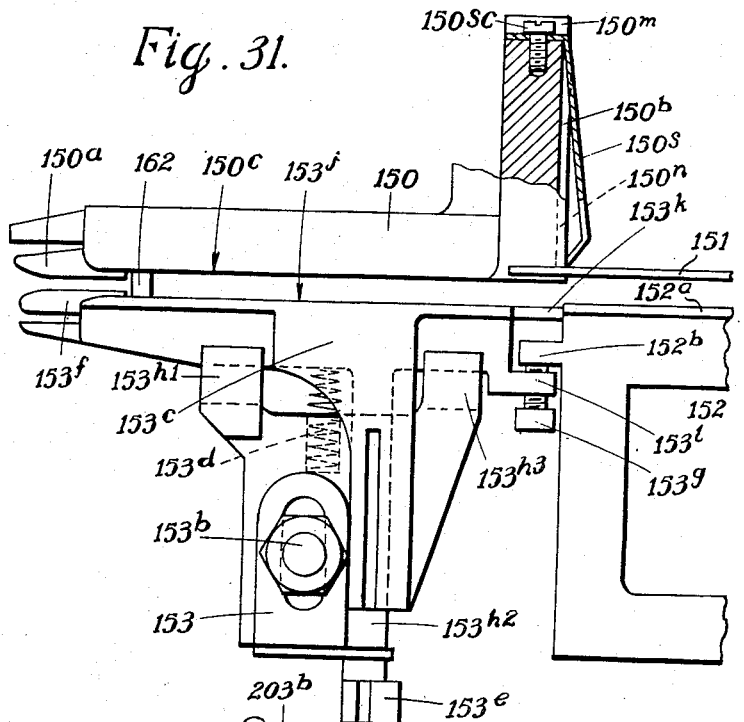
Figure 31 is a plan view of the line control mechanism.

In Figure 30 there is shown a general view of the control features of the existing machine, i. e. that known under the registered trade-mark Monotype, adapted for use either with the control mechanism of Figure 18 or with the panel A mechanism shown in Figure 32 to be described later. The known features comprise the galley cam table 160 which lifts the rule 151 by means of a roller 160a on a lever 160b pivoted at 160c and engaging the rule lifting rod 151a by its forked end 160d. When the rule 151 is lifted, the type engaging hook 154 causes the line of type between the fixed type wall 150 and the adjustable wall 153 to be positioned for displacement by the column pusher 152, so that the last type cast is adjacent to the surface 150b of the wall 150 as shown in Figure 31. The thrust of the column pusher 152 is effected by a cam surface 160e which drives a projection 154c on a lever 154x pivoted at 154a and having a cam face 154b which controls its rest position. The forward thrust of the pusher 152 is governed by the travel of a cam 160e, there being an interposed spring box 152e having ball heads recessed at 152c and 152d. A so-called snail cam 155 controls the return position of the face 152f of the pusher relative to the wall surface 153j in a known manner.

In the arrangement according to the present invention, the snail cam 155 is secured to a shaft 155a for automatic operation. A bevel gear 155f on the said shaft meshes with a bevel gear 155c on a shaft 155e rotatable in a bearing 155d. A pinion 155b on the shaft 155e meshes with a toothed rack 156c. A second bevel gear 155g on the shaft 155e meshes with a bevel gear 156b on a shaft 156a.

The governing control element for the various adjustments required is a bar 158 slidably guided for longitudinal displacement and which can be operated manually by the connecting link 116b on the lever 116 as shown in Figure 18. This link 116b is connected by a pin 116c to an eye 158e on the bar 158. Alternatively the bar can be operated by a link 170 from the panel A mechanism to be described later.

Displacement of the bar 158 to the left as seen in Figure 30 causes a toothed rack 158a to rotate a pinion 157b on a shaft 157a of the known heating control means, thereby regulating the heating of the metal melting pot. A further toothed rack 158b meshes with a pinion 159b on a shaft 159a for regulating the valve 159 in the water cooling supply pipe 159c, 159d for the mould, the waste passing away through the pipes 159e and 159f.

The shaft 156a which is also driven from the bar 158 as previously described is arranged to actuate the rheostat 156 of the existing machine for regulating the speed of the driving motor.

Thus by the above arrangement there is provided means for regulating, either by hand or automatically, the adjustment of the mould, the speed of operation of the machine, the cooling of the mould, the heating of the casting metal, and the position of the pusher which receives the line of type prior to its displacement into the galley. Means can also be provided, as described hereinafter, for regulating the pump and the type engaging wall. These adjustments can be effected without stopping the machine if the matrix case contains all the matrices required. It will be understood that the arrangement is otherwise as in the existing machine referred to previously.

Figure 31 shows a part of the line collecting mechanism as modified in accordance with the present invention. The pusher 152 previously referred to has a lug 152b which acts as a control means for adjusting the channel wall 153c according to the size of type to be cast. The arrangement is such that when the engaging surfaces 150c and 153j of the channel walls have type between them and the pusher 152 is travelling forward, the lug 152b can pass through a slot 153k in an overhanging part of the channel wall 153c without interference. On the return stroke of the pusher 152 the spacing of the wall surfaces is determined as described later. For this purpose the main assembly block 153 is secured by a bolt 153b in the groove 153a in the machine base and the initial setting is such that the channel surfaces 150c and 153j are almost in contact. The movable wall part 153c is loaded by a spring 153d and is guided by a tongue and groove arrangement in its movements towards and away from the fixed wall. Spring ears 150a and 153f are provided on the fixed and adjustable walls respectively to prevent the type from falling into the type channel after being ejected from the type carrier by the pusher. A stop 153e limits the forward movement of the movable wall part 153c and clearance is provided at 153h¹, 153h² and 153h³ to permit the displacement of the movable wall part 153c for larger type than is indicated by the quad space or type at 162. A lug 153l is provided on the movable wall part 153c and carries an adjusting screw 153g for aligning the pusher 152 and the line support 152a. The arrangement is such that at the end of a line of small type the hook 154 gathers the type before the pusher 152 which ejects it into the galley, and during this operation the control bar 158 is moved to a different position, whereby the snail cam 155 is adjusted to permit the pusher to return to a rearwardly displaced position under the action of its spring 152g, appropriate to larger type. At the same time the lug 152b adjusts the movable wall 153c rearwardly to provide a wider entrance for the type.

Owing to the vibration which occurs in the machine there is a possibility that when a line of type containing an initial type is displaced by the pusher 152, the smaller type may become dislodged. Means is therefore provided to steady the line of type after displacement by the pusher and such means comprises a spring arranged in the wall of the area into which the line of type is pushed. Also the line of type containing the initial type requires to be displaced a few thousandths of an inch lengthwise to clear type next to the space type body of the succeeding line which is employed to underpin the overhang of the initial type, otherwise the said space type might displace the initial type when the said succeeding line of type is advanced. For this reason the spring should apply lengthwise pressure to the line at the opposite end to the initial. As shown in Figure 31, a flat spring 150s is mounted in a recess 150n in the face of the wall 150b and is secured by a screw 150sc located in a recess 150m. The shape of the spring is such that it slopes inwardly as shown at the end next to the column rule 151 and has a projecting surface in front of the said rule. The arrangement is such that as the line of type is delivered into the reception area it receives an endwise thrust from the spring for the purpose referred to above. The location of the spring in the vertical direction is such that it can enter the usual groove in the line pusher which is shown at 152g in Figure 30. The removable line support or rule is shown at 152a. It will be understood that the arrangement is otherwise as in the existing machine. When casting with control strips as in patent application No. 229,341 when the initial will be at the opposite end of the line, as already explained, the spring thrust will come towards wall 150 by a similar spring arrangement 150s in the retractable wall opposite to it (not shown).

For effecting the required adjustments of the mould and its associated mechanism automatically a so-called panel A mechanism is employed as shown in Figure 32. This mechanism can be employed either in conjunction with or independently of an apparatus for making up and correcting typographical matter as described in the specification of patent application No. 229,342. A panel A mechanism is described and illustrated in the above-mentioned specification and a slightly modified form is also described and illustrated in the specification of British patent application No. 18,120 of 1950 where it is applied to apparatus for the photographic reproduction of typographical matter. For the details of this mechanism reference may be made to the above-mentioned specifications and the following description therefore deals only with the primary functions and connections of the mechanism as applied to the adjustable mould. It will be appreciated that the controlling functions are effected by pistons operated by compressed air in a cylinder block 1090a under the control of a perforated strip mechanism. Preferably the control of the compressed air for operating the pistons is effected through a valve chest as described in the latter of the above-mentioned patent specifications. By this means a rack 156x is raised to a greater or less extent as required and thereby effects an angular setting of suitably dimensioned stop or setting members carried upon angularly adjustable discs 1050 and 1102. The actual controlling displacements are effected from an oscillating lever 1000 actuated from a cam or other suitable means in the existing machine and coupled to a reciprocating cross head 1004 which, in its travel to the left as viewed in the figure, engages the end of one or other of a series of dimensioned rods such as 1066, 1067 or 1068 mounted in a disc 1050 secured to a longitudinally slidable shaft 1060, the particular rod engaged being dependent on the angular position of the disc 1050 as determined by the rack 156x. The rods are threaded into thimbles 1066b and secured therein by lock nuts 1066a, the thimbles being removably seated in the disc 1050 so that the rods can be readily exchanged when required. The shaft 1060 is coupled to a slidable bar 1014 from which a rod 170 connects to the bar 158 of Figure 35 or to the rack 101 of Figure 12 for example. The cross head 1004 has an extension 1131 for actuating, through a spring 1132, a rod 1108 attached to a slidable rack 1120 having two teeth which can be engaged by a pawl, and the rack can be engaged with a rod such as 1103 carried in a disc 1102 which is angularly positioned by the rack 156x. The rod 1108 has a connection 115pa with the linkage for adjusting the matrix centering pin of the mould as shown in Figure 28.

The rack 156x can be actuated by means of a hand lever 1400 if desired. It will be understood that by this mechanism the predetermined displacements imparted to the connecting linkages 170 and 115pa can be employed to effect the required mould and machine adjustments including the adjustment of the matrix centering pin. The mechanism may also include the indicator and green flag arrangements as described in the specification of patent application No. 229,342, filed June 1, 1951.

The controlling setting rods such as 1066 can readily be dimensioned to afford the abnormal mould adjustments as described in conjunction with Figure 21 as well as the required adjustments for casting normal type casting.

Means is provided for regulating the operation of the metal pump of the existing machine in accordance with the size of type to be cast as shown in Figure 33. The rack bar 158 shown in Figure 30 is displaced in accordance with the size of the cast type. A bar 161 is connected at 161a to the bar 158 and carries two studs 161b and 161c as shown in Figure 35. The arrangement is such that the stud 161b engages a lever 161d at a predetermined position. A spring 161n attached to the lever is anchored at 161o so that when the lever has passed the vertical it will be spring actuated so that a lug (not shown) on its inner face strikes a lever 161k, both levers then being arrested by a fixed stop 161m. This snap action movement takes place at a position of the bar 158 corresponding to a type size of about fourteen points, and is employed for engaging the pump latch through a connecting link 161p. To effect the return of the levers a link 161g connected to the lever 161d at 161f is connected at 161k to a lever 161i. When the lever 161d is in latch disengaging position the cranked end of the lever 161i is clear of the stud 161c, but when the said lever has been actuated as described above the lever 161i is in the path of the stud 161c on the return of the bar 158 so that the lever 161d is restored to its initial position.

Referring to Figure 33, the bar 161 is extended as shown at 161p and is slidably guided in the pump housing. For the purpose of pump regulation a packing plate 200 is required to be inserted between the pump base 204 and the adjustable lock nuts 205 on the reciprocating pump spring control rod 201 of the known pump mechanism. The bar 161p is cranked as indicated at 161ps and passes through a slot in the packing plate 200 indicated at 200a. Thus displacement of the bar 161p causes displacement of the plate 200 which is slidable in guides 202 secured to the pump base 204 and is thereby inserted in packing position. The bar 161p also carries a cam faced head 161q which is loaded by springs 161s. As the bar 161p is displaced upwardly as viewed in the figure, the head 161q strikes a pin 204 on a control plate 203 pivoted at 205. Also pivoted at 205 is the known latch plate 203a which, when in the position shown, limits the reciprocating movement of the known pump cross head 206 which has a regulating action on the spring controlling the known ejection plunger of the pump, whereby a sharper ejection action is achieved. The latch plate 203a is normally disengaged from the cross head 206 and is held in such position by the control plate 203, a stud 203b which engages the latch plate when the spring 207 rotates the control plate 203 in an anti-clockwise direction as viewed in the figure. This motion is caused by the head 161q striking a pin 204 on the control plate 203 when the bar 161p is displaced as previously described. In this position of the mechanism the cross head 206 performs its ordinary motions and the operation of the pump ejection plunger is normal. When a large type is to be cast the bar 161p is displaced by the means previously described and the cam faced head 161q moves to the position in which it is shown in Figure 33, thereby causing the control plate 203 to be rotated in a clockwise direction so that the spring 207 passes over the dead centre and holds the control plate in the position shown. In its motion the pin 203b of the control plate actuates the latch plate 203a into the position shown where it acts as a stop for the cross head 206 and thereby provides for the required sharper action of the pump ejecting plunger required for larger type bodies. The pump mechanism is otherwise the same as in the existing machine.

To prevent undue cooling of the mould when casting is interrupted for an appreciable period, as when cancelling several lines in succession when using the mould in conjunction with apparatus according to patent application No. 229,342, filed June 1, 1951, means is provided for cutting off the cooling air and/or water supply when the metal pump is inoperative for a longer period than is required for the usual single and double justification operations, such means being shown in Figure 34. The air and water control valves 210 and 211 are connected by levers 210a and 211a to a common link 212b carrying a projection 212 which can be displaced upwardly by any one of the three lifting bars 214 to close the valves. A spring 211b opens the valves when the bars 214 are withdrawn downwardly, each of the bars being slotted as shown at 212a. The bars 214 are connected to latch bars 215 pivoted at 215a and capable of being actuated by links 215b from pistons 215c in a cylinder block 215d. The pistons can be actuated by compressed air from the apparatus described in the specification of patent application No. 229,342. The pump collar rod 216 of the known pump carries a block 217, and the arrangement is such that the rod can be held in its "off" position by latches 218 pivoted to the bars 215 when the latches are lifted, which occurs when the rod 217 and its block 216 are withdrawn for a normal casting operation. The latches 218 are lifted by springs 218b. The arrangement is such that when any one of the pistons 215c is actuated, the air and water control valves 210 and 211 are closed. The latches 218 are prevented from lifting when the bars 215 are raised owing to the block 217 lying in their path, so that they rotate about their pivot 218a until the block is withdrawn. When this occurs the latches are drawn upwards by their springs and thereby prevent the return of the block 217 and interrupt the operation of the pump. The pistons 215c would return to inoperative position when their air supply is interrupted after the usual impulse interval but the bars 215 are prevented from returning by stop lugs 219 engaging projections 219a on the bars 215, these stop lugs being loaded by springs 219b. Actuation of a rod 220 removes the stop lugs 219 and allows the bars 215 to return to the position shown in Figure 34. This mechanism is also described in the specification of patent application No. 229,342, filed June 1, 1951, to which reference may be made.

It will be seen that by this invention there is provided (a) an improved adjustable mould for use in conjunction with the existing type casting machine known under the registered trade-mark Monotype; (b) an improved adjustable mould capable of being used in conjunction with a making up and correcting apparatus according to patent application No. 229,342, filed June 1, 1951; (c) a mould as under (b) in which the adjustments for different type sizes are effected automatically; and (d) an improved adjustable mould capable of being used in conjunction with other type casting machines. The invention also provides ancillary controlling and regulating means as previously described.

I claim:

1. A mould for the purpose described comprising at least two mould dimensioning blades, a cross block, lateral guide blocks between which the mould blades are movable to form a mould cavity of the desired size between the ends of said blade or blades in relation to the cross block, a supporting structure for the cross block and guide blocks including casting metal injection inlet means located at one end of the mould cavity opposite that to which the character moulding face or matrix is applied, said cross block being displaceable relative to the supporting structure to form a mould cavity and to permit ejection of the type body from the mould after casting, movable positioning means for the guide blocks and mould blades permitting transverse displacement thereof relative to the supporting structure, and means enabling such displacement to be adjustably effected to bring the injection inlet means into a position in the neighbourhood of the mid-point of the variable dimension of the mould as determined by the blade or blades.

2. A mould according to claim 1, comprising an intermediate plate mounted for slidable adjustment upon the supporting structure and having a casting metal inlet, the blade or blades and the lateral guide blocks being secured to said intermediate plate.

3. A mould according to claim 1, in which the supporting structure carries a stationary intermediate plate having a casting metal inlet, and the mould blades and their lateral guide blocks are adjustably arranged relative to said plate.

4. A mould according to claim 1, comprising at least one mould blade separating member interposed between the mould blades.

5. A mould according to claim 1, comprising at least one mould blade separating member interposed between the mould blades and having cooling passages therein, and means for supplying cooling medium to said member.

6. A mould according to claim 1, in which means is provided for supplying a cooling medium to the cross block.

7. A mould according to claim 1, comprising an intermediate plate slidably mounted on the supporting structure and carrying the mould blades, means for displacing said plate, and means for locking the said plate in adjusted position.

8. A mould according to claim 1, comprising an intermediate plate slidably mounted on the supporting structure and carrying the mould blades, means for displacing said plate, and wedge means for locking the said plate in adjusted position.

9. A mould according to claim 1, comprising an intermediate plate slidably mounted on the supporting structure and carrying the mould blades, means for displacing said plate, a pair of wedge means for engaging the ends of the said plate for locking the same in adjusted position, and a compensating lever interconnecting the wedge means for actuation thereof.

10. A mould according to claim 1, comprising an intermediate plate slidable upon the supporting structure and carrying the mould blades, said plate being adjustably displaceable.

11. A mould according to claim 1, comprising means for effecting selective blade withdrawal for the purpose of mould dimensioning, and means for preventing withdrawal of any blade other than the selected blade.

12. A mould according to claim 1, comprising means for effecting selective blade withdrawal for the purpose of mould dimensioning, and stop bars extending transversely through the blades and displaceable therein, the adjacent ends of said stop bars being spaced to leave a gap to permit withdrawal of one or more selected blades according to the position of the bars while preventing withdrawal of any other blade.

13. A mould according to claim 1, comprising an intermediate plate secured to the supporting structure upon which the mould blades and lateral guide blocks are slidable against spring loading means, and screw threaded means for adjusting the position of the blades and blocks against said loading.

14. A mould according to claim 1, comprising means for withdrawing two adjacent mould blades simultaneously to afford a mould cavity the dimension of which is determined by the combined width of the two blades.

15. A mould according to claim 1, comprising a plurality of blades having individually different widths.

16. A mould according to claim 1, in which the mould blades comprise upper and lower blade elements, and the means for withdrawing selected lower blade elements comprise couplings slidable in lateral guides and each having a lug in laterally slidable engaging relation with recesses in the upper and lower edges of the blade element.

17. A mould according to claim 1, in which the mould blades are slotted and a stop bar extends transversely through the blade slots for limiting blade displacement.

18. A mould according to claim 1, comprising manually operable blade adjusting means including a slidable bar, a plurality of dimensioned elements carried by said bar for determining the extent of blade adjustment, said elements being dimensioned to correspond proportionally with the mould blade dimensions, and means for locating the said elements in selected position according to the mould adjustment required.

19. A mould according to claim 1, comprising manually operable blade adjustable means including a slidable bar, a plurality of dimensioned elements carried by said bar for determining the extent of blade adjustment, said elements being dimensioned to correspond proportionally with the mould blade dimensions, and means for locating the said elements in selected position according to the mould adjustment required, there being at least two series of said elements arranged to be employed alternatively for different mould adjustments.

20. A mould according to claim 1, comprising manually operable blade adjustment means including a slidable bar, a plurality of dimensioned elements carried by said bar for determining the extent of blade adjustment, said elements being dimensioned to correspond proportionally with the mould blade dimensions, means for locating the said elements in selected position according to the mould adjustment required, and means such as a micrometer head arrangement for adjusting the series of elements along the bar.

21. A mould according to claim 1, in combination with a centering pin for positioning and clamping a character forming matrix, said centering pin having a coned end which is eccentric with respect to the pin axis, and means for angularly adjusting the pin to vary the position of the matrix for casting.

22. A mould according to claim 1, in combination with a centering pin for positioning and clamping a character forming matrix, said centering pin having a coned end which is eccentric with respect to the pin axis, and means for angularly adjusting the pin to vary the position of the matrix for casting, said adjusting means controlled by means dependent upon the size of the type to be cast.

23. A mould according to claim 1, in combination with a centering pin for positioning and clamping a character forming matrix, said centering pin having a coned end which is eccentric with respect to the pin axis, rack and pinion means for angularly adjusting the pin to vary the position of the matrix for casting, means for adjusting the mould blades comprising a slidable bar carrying a plurality of dimensioned elements which are dimensioned to correspond proportionally with the mould blade dimensions, means for locating the said elements in selected position according to the mould adjustment required, and means coacting with said elements for positioning the rack of the aforesaid rack and pinion arrangement whereby the angular position of the centering pin is adjusted in accordance with the size of type to be cast.

24. A mould according to claim 1, in combination with a character forming matrix and means for positioning the latter on the mould, and adjustment means for the mould blades enabling the mould cavity to be positioned to either side of an axis defining the centres of the metal injection inlet and of the matrix strike to enable type to be cast in conjunction with a standard form of matrix, having its head relatively displaced on the type body.

25. A mould according to claim 1, in combination with a character forming matrix and means for positioning the latter on the mould, including mould blades dimensioned and arranged to give a cast type with a face carrying portion having a larger point dimension than the type body, and adjustment means for the blades enabling the mould cavity to be positioned to either side of an axis defining the centres of the metal injection inlet and of the matrix strike to enable type to be cast in conjunction with a standard form of matrix, having its head relatively displaced on the type body.

26. A mould according to claim 1, in combination with a character forming matrix and means for positioning the latter on the mould, including mould blades dimensioned and arranged to give a cast type having a smaller point dimension on the face carrying portion than the larger point dimension of the type body, and adjustment means for the blades enabling the mould cavity to be positioned to either side of an axis defining the centres of the metal injection inlet and of the matrix strike to enable type to be cast in conjunction with a standard form of matrix, having its head relatively displaced on the type body.

27. A mould according to claim 1, comprising means for supplying a cooling medium to the mould and means for varying the supply of said medium in accordance with the size of the type to be cast.

28. A mould according to claim 1, in combination with a casting machine, comprising means for varying the heating of the casting metal in accordance with the size of the type to be cast.

29. A mould according to claim 1, in combination with a single-type casting machine, comprising means for varying the speed of operation of the machine in accordance with the size of the type to be cast.

30. A mould according to claim 1, in combination with a single-type casting machine having a metal injection pump for injecting molten metal into the mould, comprising means for modifying the action of the pump in accordance with the size of type to be cast to afford a sharper ejection of metal from the pump when casting larger type than when casting smaller type.

31. A mould according to claim 1, in combination with a single-type casting machine, comprising means for effecting adjustment of the mould blades to give different sizes of type, a common actuating element operatively connected to said adjustment means, and means actuated by said common element for varying different factors affecting the casting operation such as the supply of a cooling medium to the mould, the heating of the casting metal, the speed of operation of the machine, and the action of the metal injection pump in accordance with the size of the type to be cast.

32. A mould according to claim 1, in combination with a single-type casting machine, comprising means for effecting adjustment of the mould blades to vary the size of the type cast under the control of perforated record strip control mechanism.

33. A mould according to claim 1, in combination with a single-type casting machine, comprising a controlling element for effecting adjustment of the mould blades to vary the size of type cast, a plurality of settable members for determining the travel of said control element for different type sizes, and perforated record strip control mechanism for setting said members.

34. A mould according to claim 1, in combination with a single-type casting machine, comprising a controlling element for effecting adjustment of the mould blades to vary the size of type cast, a plurality of settable members for determining the travel of said control element for different type sizes, and compressed air actuated piston means for setting the said settable members under the control of perforated record strip control mechanism.

35. A mould according to claim 1, in combination with a single-type casting machine, comprising a controlling element for effecting adjustment of the mould blades to vary the size of type cast, a plurality of settable members for determining the travel of said control element for different type sizes, driven means for displacing the said controlling element through the medium of a selected settable member, and means for setting said member under the control of a perforated record strip control mechanism.

36. A mould according to claim 1, in combination with a single-type casting machine, comprising a controlling element for effecting adjustment of the mould blades to vary the size of type cast, a plurality of settable rod members mounted on a shaft which is rotatable to bring a selected member into operative position, said rod members being dimensioned for determining the travel of said control element for different type sizes, driven means for displacing the said control element through the medium of a selected and positioned settable and positioned settable rod member, and means for adjustably rotating the said shaft under the control of perforated record strip control mechanism.

37. A mould according to claim 1 in combination with a single-type casting machine, comprising a controlling element for effecting adjustment of the mould blades to vary the size of type cast, a plurality of settable members for determining the travel of the said control element for different type sizes, a second controlling element for adjustment the centering over the mould cavity of the mould matrix, settable members for determining the travel of said second controlling element, and perforated record strip controlling mechanism for setting the said settable members in accordance with the size of type to be cast.

38. A mould according to claim 1, in combination with a single-type casting machine, comprising line collecting means including fixed and adjustable walls forming a channel for receiving the type lengthwise, guide walls disposed at right angles to said channel, pusher means for displacing the line of type laterally between said guide walls for collection in a galley, and means for varying the position of the said adjustable channel wall and of the face of the pusher means in its withdrawn position in accordance with the size of the cast type.

39. A mould according to claim 1, in combination with a single-type casing machine, comprising line collecting means including fixed and adjustable walls forming a channel for receiving the type lengthwise, the adjustable wall being slidably mounted and spring loaded, guide walls disposed at right angles to said channel, pusher means for displacing the line of type laterally between said guide walls for collection in a galley, a variable position abutment for determining the withdrawn position of the pusher means, means for varying the position of said abutment in accordance with the size of type cast, and an operative connection between the pusher means and the slidably mounted adjustable channel wall to displace the latter by the return movement of the pusher means to an extent determined by the aforesaid abutment so that the positions of the adjustable channel wall and pusher means relative to the fixed channel wall are appropriate to the size of type to be cast.

40. A mould according to claim 1, in combination with a single-type casting machine, comprising means for effecting adjustment of the mould blades for varying the size of the cast type, an actuating element operatively connected to said adjustment means, collecting means including fixed and adjustable walls forming a channel for receiving the type lengthwise, the adjustable wall being slidably mounted and spring loaded, guide walls disposed at right angles to said channel, pusher means for displacing the line of type laterally between said guide walls for collection in a galley, a variable position abutment for determining the withdrawn position of the pusher means, cam means operatively connected with the aforesaid actuating element for determining the position of the abutment, and an operative connection between the pusher means and the slidably mounted adjustable channel wall to displace the latter by the return movement of the pusher means to an extent determined by the aforesaid abutment so that the positions of the adjustable channel wall and pusher means relative to the fixed channel wall are appropriate to the size of type to be cast.

41. A mould according to claim 1, in combination with a single-type casting machine, comprising means for supplying a cooling medium to the mould and means for interrupting said supply when operation of the casting metal pump is interrupted for an appreciable period.

42. A mould according to claim 1, in combination with a single-type casting machine, comprising means for supplying a cooling medium to the mould, valve means for controlling said supply, and compressed air piston means for actuating said valve means to cut off the supply, said compressed air piston means being controlled by means rendered operative when operation of the casting metal pump is interrupted for an appreciable period.

43. A mould according to claim 1, in which each of the blades comprises upper and lower blades relatively movable and dimensioned to provide a mould cavity for the casting of high and low space type bodies as required, the size of the type body forming mould cavity being determined by the number of blades withdrawn from the cross block.

44. A mould for the purpose described comprising at least two mould dimensioning blades, a cross block, lateral guide blocks between which the mould blades are located side by side and movable to constitute a type body forming mould cavity of the desired size between the ends of the blade or blades in relation to the cross block according to the number of blades withdrawn from the latter, each of said blades comprising relatively movable upper and lower blades, and means for independently withdrawing selected upper and lower blades as required, the said blades being dimensioned to provide a mould cavity for the casting of high or low space type bodies according to the blade or blades withdrawn.

45. A mould for the purpose described comprising at least two mould dimensioning blades, a cross block, lateral guide blocks between which the mould blades are located side by side and movable to constitute a type body forming mould of the desired size between the ends of the blade or blades in relation to the cross block according to the number of blades withdrawn from the latter, a supporting structure for the cross block and guide blocks, movable positioning means for the guide blocks and mould blades permitting transverse displacement thereof relative to the supporting structure, each of said blades comprising relatively movable upper and lower blades, and means dependent upon said transverse displacement for independently withdrawing selected upper and lower blades as required, the said blades being dimensioned to provide a mould cavity for the casting of high or low space type bodies according to the blade or blades withdrawn.

46. A mould blade for the purpose described comprising at least two mould dimensioning blades, a cross block, lateral guide blocks between which the mould blades are located side by side and movable to constitute a type body forming mould cavity of the desired size between the ends of the blade or blades in relation to the cross block according to the number of blades withdrawn from the latter, each of said blades comprising relatively movable upper and lower blades, recesses in the upper and lower blades, and means for independently engaging said recess for withdrawing selected upper and lower blades as required, the said blades being dimensioned to provide a mould cavity for the casting of high or low space type bodies according to the blade or blades withdrawn.

47. A mould according to claim 46, in which couplings slidable in lateral guides are provided having a lug in laterally slidable engaging relation with the lower blade recesses for withdrawing a selected blade.

48. A mould for the purpose described comprising at least two mould dimensioning blades, a cross block, lateral guide blocks between which the mould blades are located side by side and movable to constitute a type body forming mould cavity of the desired size between the ends of the blade or blades in relation to the the cross block according to the number of blades withdrawn from the latter, each of said blades comprising relatively movable upper and lower blades, means for independently withdrawing selected upper and lower blades as required, the said blades being dimensioned to provide a mould cavity for the casting of high or low space type bodies according to the blade or blades withdrawn, a character forming matrix and means for positioning the latter on the mould, and adjustment means for the mould blades enabling the mould cavity to be positioned to either side of an axis defining the centres of the metal injection inlet and of the matrix strike to enable type to be cast in conjunction with a standard form of matrix, having its head relatively displaced on the type body.

49. A mould for the purpose described comprising at least two mould dimensioning blades, a cross block, lateral guide blocks between which the mould blades are located side by side and movable to constitute a type body forming mould cavity of the desired size between the ends of the blade or blades in relation to the cross block according to the number of blades withdrawn from the latter, each of said blades comprising relatively movable upper and lower blades, means for independently withdrawing selected upper and lower blades as required, the said blades being dimensioned and arranged to provide a mould cavity for the casting of high or low space type bodies according to the blade or blades withdrawn and to give a cast type with a face carrying portion having a larger point dimension than the type body, a character forming matrix and means for positioning the latter on the mould, and adjustment means for the blades enabling the mould cavity to be positioned to either side of an axis defining the centres of the metal injection inlet and of the matrix strike to enable type to be cast in conjunction with a standard form of matrix, having its head relatively displaced on the type body.

50. A mould for the purpose described comprising at least two mould dimensioning blades, a cross block, lateral guide blocks between which the mould blades are located side by side and movable to constitute a type body forming mould cavity of the desired size between the ends of the blade or blades in relation to the cross block according to the number of blades withdrawn from the latter, each of said blades comprising relatively movable upper and lower blades, means for independently withdrawing selected upper and lower blades as required, the said blades being dimensioned and arranged to provide a mould cavity for the casting of high or low space type bodies according to the blade or blades withdrawn and to give a cast type with a face carrying portion having a smaller point dimension on the face carrying portion than the larger point dimension of the type body, a character forming matrix and means for positioning the latter on the mould, and adjustment means for the blades enabling the mould cavity to be positioned on either side of an axis defining the centres of the metal injection inlet and of the matrix strike to enable type to be cast in conjunction with a standard form of matrix, having its head relatively displaced on the type body.

HENRY GEORGE CROUCHER.

References Cited in the file of this patent

UNITED STATES PATENTS

| Number | Name | Date |
|---|---|---|
| 1,112,886 | Bellows | Oct. 6, 1914 |
| 1,328,256 | Bancroft et al. | Jan. 20, 1920 |
| 1,372,074 | Indahl | Mar. 22, 1921 |
| 1,511,095 | Pierpont et al. | Oct. 7, 1924 |

FOREIGN PATENTS

| Number | Country | Date |
|---|---|---|
| 142,545 | Great Britain | May 4, 1920 |
| 276,555 | Great Britain | Sept. 1, 1927 |
| 354,633 | Great Britain | Aug. 13, 1931 |